United States Patent
Winiewicz et al.

(10) Patent No.: US 6,966,950 B2
(45) Date of Patent: Nov. 22, 2005

(54) METHOD AND APPARATUS FOR TREATING UNDERGROUND PIPELINE

(76) Inventors: Anthony E. Winiewicz, 28 Frank Ave., Revere, MA (US) 02151; Randall A. Nichols, 143 Essex St., Chelsea, MA (US) 02150

( * ) Notice: Subject to any disclaimer, the term of this patent is extended or adjusted under 35 U.S.C. 154(b) by 216 days.

(21) Appl. No.: 10/246,790

(22) Filed: Sep. 18, 2002

(65) Prior Publication Data

US 2003/0039752 A1    Feb. 27, 2003

Related U.S. Application Data

(63) Continuation-in-part of application No. 09/337,578, filed on Jun. 22, 1999, now Pat. No. 6,514,346, which is a continuation-in-part of application No. 09/047,837, filed on Mar. 25, 1998, now Pat. No. 5,913,977.

(60) Provisional application No. 60/323,342, filed on Sep. 18, 2001.

(51) Int. Cl.$^7$ ............................................. B05C 7/08
(52) U.S. Cl. ..................... 118/712; 118/713; 118/215; 118/254; 118/306; 118/317; 118/DIG. 10; 138/98
(58) Field of Search ..................... 118/214, 215, 254, 118/306, 317, 712, 713, 408, DIG. 10; 427/236; 138/98; 156/94

(56) References Cited

U.S. PATENT DOCUMENTS

| | | |
|---|---|---|
| 3,047,270 A | 7/1962 | Moore |
| 3,842,864 A | 10/1974 | Riegel et al. |
| 3,885,521 A | 5/1975 | von Arx |
| 3,989,006 A | 11/1976 | Estebanez et al. |
| 4,043,295 A | 8/1977 | Speck et al. |
| 4,178,875 A | 12/1979 | Moschetti |
| 4,218,989 A | 8/1980 | Fujita et al. |
| 4,253,497 A | 3/1981 | Martin et al. |
| 4,308,824 A | 1/1982 | Muta et al. |
| 4,437,494 A | 3/1984 | Soper et al. |
| 4,505,295 A | 3/1985 | Quin et al. |
| 4,582,551 A | 4/1986 | Parkes et al. |
| 4,584,963 A | 4/1986 | Morinaga et al. |
| 4,627,471 A | 12/1986 | Parkes et al. |
| 4,994,307 A | 2/1991 | Price et al. |
| 4,996,940 A | 3/1991 | Cleary |

(Continued)

FOREIGN PATENT DOCUMENTS

DE    37 15 653 A1    12/1988

(Continued)

OTHER PUBLICATIONS

Patent Abstracts of Japan, vol. 10, No. 155 (M-485), Jun. 4, 1986 & JP 61 010632 A (Hatsukoo:KK), Jan. 18, 1986; 1 pg..

Primary Examiner—Laura Edwards
(74) Attorney, Agent, or Firm—Lowrie, Lando & Anastasi, LLP

(57) ABSTRACT

A system for internally filling a joint or other discontinuity in a pipeline. The system includes a flexible conduit, a fill device removably connected to said flexible conduit, wherein the fill device is constructed and arranged to apply a fill material to an interior surface of said pipeline to fill one or more gaps in the pipeline, and a propulsion unit connected to at least one of the flexible conduit and the fill device that propels the flexible conduit through said pipeline.

16 Claims, 25 Drawing Sheets

U.S. PATENT DOCUMENTS

| | | |
|---|---|---|
| 5,089,297 A | 2/1992 | Koga et al. |
| 5,156,886 A | 10/1992 | Kitson |
| 5,195,392 A | 3/1993 | Moore et al. |
| 5,309,947 A | 5/1994 | Hinger |
| 5,527,169 A | 6/1996 | Goldenberg et al. |
| 5,586,580 A | 12/1996 | Fisk et al. |
| 5,611,283 A | 3/1997 | Cotton et al. |
| 5,913,977 A | 6/1999 | Nichols |
| 6,024,515 A | 2/2000 | Konwinski et al. |
| 6,142,187 A | 11/2000 | Goldenberg et al. |
| 6,180,169 B1 | 1/2001 | Nichols |
| 6,514,346 B1 | 2/2003 | Nichols |

FOREIGN PATENT DOCUMENTS

| | | |
|---|---|---|
| DE | 196 07 267 C1 | 2/1996 |
| EP | 0 126 647 B1 | 11/1984 |
| EP | 0 126 648 A2 | 11/1984 |
| EP | 0 294 243 A2 | 12/1988 |
| EP | 0 426 871 A1 | 5/1991 |
| EP | 0 621 434 A1 | 10/1994 |
| GB | 1 328 886 | 9/1973 |
| GB | 1 591 409 | 6/1981 |
| GB | 2 267 545 A | 12/1993 |
| JP | 63-297895 | 5/1988 |
| WO | WO 95/25925 | 9/1995 |
| WO | WO 96/06299 | 2/1996 |

METHOD AND APPARATUS FOR TREATING UNDERGROUND PIPELINE

RELATED APPLICATIONS

This application is a continuation-in-part of U.S. Ser. No. 09/337,578, filed Jun. 22, 1999, now U.S. Pat. No. 6,514,346, which is a continuation-in-part of U.S. Ser. No. 09/047,837, filed Mar. 25, 1998, now U.S. Pat. No. 5,913,977, each of which is incorporated herein by reference, and in addition, this application claims priority to Provisional Application 60/323,342, filed Sep. 18, 2001, which is also incorporated herein by reference.

FIELD OF THE INVENTION

The present invention relates generally to apparatus and methods for internally treating pipeline or conduit. Particularly, this invention relates to treating, bridging, filling and or sealing pipe joints or other discontinuities in situ in a variety of different types of pipeline or conduit, such as live propane, live natural gas, water or sewer pipeline. Even more particularly, this invention relates to internally, milling, filling and sealing pipe joints or other discontinuities in live propane or natural gas pipeline, and the automation thereof.

BACKGROUND OF THE INVENTION

A dilemma has arisen in the gas and gas transportation industry. Low-moisture gas, such as propane or natural gas, has replaced high-moisture manufactured gas, such as coal gas, as a source of domestic and industrial fuel. Traditionally, and for many decades, coal or other high-moisture gases were fed to customers by underground pipes. Typically, these gas pipelines were constructed of individual lengths of pig or cast iron pipe. These individual lengths of pipe were commonly joined together by bell or lap joints that were sealed with a combination of a filler material and lead or grout.

Several different types of filler material were used including horsehair, yarn, jute and hemp. It was discovered that, as many municipalities converted from high-moisture manufactured gas to the relatively low-moisture propane or natural gas, the filler material in the pipe joints would dry out. As these filler materials dry out, they decompose and disintegrate, thereby causing gas leaks to appear at the pipe joints.

The decay of joint filler due to the conversion to low-moisture gas is not unique to the United States. The United Kingdom is experiencing similar decay of their gas pipe joint filler. As a preventative measure, and as an attempt to slow down the decay of filler material, many gas companies in the United Kingdom, and a few in the United States, routinely "fog" their gas lines. Fogging normally involves sending a glycol type product through the gas pipeline to enhance the moisture content of the filler. Another method of maintaining high moisture in the filler involves a process known in the gas industry as humidification. This process requires repeated application of pressurized steam to a gas pipe system.

Unfortunately, these preventative procedures are only temporary, and can be quite costly. Today, to adequately prevent gas from escaping these types of pipelines, the pipe joints or other discontinuities must be sealed or replaced. Because many of these pipelines are underground and not readily accessible, excavating, removing and replacing an entire length of pipeline having deteriorated pipe joints is drastic and quite costly.

Other pipeline joints and discontinuities, such as those that exist in water and sewer pipelines, also require periodic treatment to prevent materials from leaking into or out of the pipeline. These leaks are a result of decaying materials such as the material used in the construction of the pipeline, certain types of obstructions or debris which may clog a pipeline, chemical exposure and or crushing due to overburden pressure. Many pipelines require repair to prevent exterior leaking and possible ground water contamination. Additionally, without proper treatment, ground water can infiltrate into the broken pipelines. Further, in water pipelines, obstructions, cracks or other discontinuities can cause areas of reduced water flow, which can result in undesirable bacterial growth.

Today, to adequately prevent gas or liquid from escaping or penetrating these types of pipelines, the pipe joints or other discontinuities must be sealed or replaced. As described above, because many of these pipelines are also underground and not readily accessible, excavating, removing and replacing an entire length of pipeline having deteriorated pipe joints is drastic and quite costly.

One method of sealing these pipe joints or discontinuities against gas leaks includes excavating an end of the pipe and having someone climb into the pipe to hand apply a coating compound. This method can be quite expensive and time consuming. Also, this method can be dangerous and is unfeasible for small diameter pipe. Another technique includes inserting a permanent lining throughout the entire length of pipe. Again this is quite costly and may cause an unacceptable reduction in the flow capacity of the pipe. Also, this method requires a large consumption of natural resources to fabricate a lining for an entire length of pipe, when typically only the joints are susceptible to leaking.

Still another method, such as U.S. Pat. No. 4,178,875 (1979, Moschetti), includes sending a device through the pipe that can remotely detect a joint or other discontinuity that needs repair. A coating material is then sent through attached tubing and is sprayed onto the inner surface of the pipe at the desired location. However, this and the above-mentioned methods are not performed on "live gas pipe" (pipe in which pressurized gas remains flowing). These methods require the gas flow to be shut down for long periods of time. Depending on the customers being serviced by the gas line, it is normally unacceptable to interrupt service for such long periods of time. Another disadvantage of these methods is that they require more than a single excavation when coating long lengths of pipeline.

Still other methods are known whereby the gas remains live while coating, repairing or sealing is accomplished. U.S. Pat. Nos. 4,582,551 and 4,627,471 (1986, Parkes et al.) disclose a method and device that can remotely seal joints or leaks in a pipe while the gas continues flowing in the pipe. The device is inserted into a pipe whose inner diameter is slightly larger than the outer circumference of the device. The device uses expandable bladders to form a substantially air-free environment, thereby isolating the joint or discontinuity from pressurized gas. The pressurized gas is rerouted through the interior of the device. Anaerobic sealant is then pumped to the device and the sealant is sprayed onto the interior of the pipe at the desired location. The device remains in place long enough to allow the anaerobic sealant to setup. A disadvantage with this device is that it requires an environment free from air and flowing pressurized gas in which to apply sealant. Another disadvantage with these types of devices is that they are limited in their ability to maneuver around corners or other obstacles in the pipeline as they are in close proximity to the interior of the pipe. Still another disadvantage with these devices is that they are slow and time consuming because they require the device to remain in place while the sealant sets.

Another method of sealing pipe joints in a live gas pipe is taught in U.S. Pat. No. 5,156,886 (1992, Kitson). This method involves inserting a nozzle attached to a hose through a tapping mandrel to a desired location in a live gas pipe, whereby an anaerobic sealant is pumped through the hose to the nozzle. The nozzle sprays the anaerobic sealant onto the interior of the pipe. This method works well on relatively short lengths of pipe. However, as the length of tubing increases, the viscosity of the anaerobic sealant prevents it from reaching the spraying device in adequate quantities. Also, as the length of tubing increases, static electric charges build up in the line due to the friction caused by the sealant rubbing against the interior of the tubing. This can pose serious problems when working in a live gas setting. Another drawback with this device is that the anaerobic sealant tends to pool in the bottom of the pipe upon application. An additional drawback of this method is that it typically requires the presence of some filler to properly seal a leaking joint. Because the above-mentioned preventative or fogging measures were never routinely performed in the United States, much of the filler in United States gas pipe joints has disintegrated, making this method of sealing pipe joints impractical.

What is needed is an apparatus and method for coating or sealing the interior of very long lengths of underground pipe or other conduit, either at a joint, another type of discontinuity or along the entire length of the pipe, while the gas in the pipe remains live, that overcomes drawbacks of prior art devices.

SUMMARY OF THE INVENTION

It is an object of the present invention to provide an apparatus and method for coating or sealing the interior of very long lengths of underground pipe or other conduit, either at a joint, another type of discontinuity or along the entire length of the pipe, while the gas in the pipe remains live.

It is still another object of the present invention to allow for several layers of coating material to be applied at the same site.

It is a further object of the present invention to provide a rapid coating process, which does not require the coating device to remain in place while the coating material sets.

It is a further object of the present invention that it can be inserted into a live gas pipe using a variety of methods.

It is a further object of the present invention that it can maneuver around bends and other obstacles normally found in gas pipe. It is still a further object of the present invention that it applies a polyurethane sealant that will coat the interior of a variety of different pipe surfaces, with or without the presence of pressurized gas, with or without the presence of air or oxygen and that will not pool in the bottom of the pipe upon application.

It is still a further object of the present invention to provide for repair of several hundred feet of live underground pipe from a single excavation point.

One or more of these objects is achieved in one aspect of the invention by providing an apparatus and a method for coating or sealing the interior of underground pipes where the apparatus is moved through the pipe while the gas is flowing. The coating device is connected to reservoirs of coating material and is specially designed to operate in the presence of propane or natural gas without incident. In addition, an epoxy-type coating material is utilized that will adhere to a variety of surfaces and that will set-up within a variety of climates, including a pressurized live gas environment. In one embodiment, the sealant material is a 100% solids system that does not rely on evaporation for curing.

To prevent electric discharge caused by friction, resulting from the individual components of coating material traveling to the coating device, the coating material components can be pumped to the coating device through grounded tubing. This makes the device safer to operate in a live gas environments.

The device can also include scissor-type expansion legs. These scissor-type legs allow the device to maneuver around corners and bends in the pipe, and to adapt to a wide variety of pipe diameters. Also, the combination of a non-conductive or electrically grounded delivery system with a specially designed pushing system, allow greater lengths of pipe to be sealed or repaired with fewer excavations than known related art devices and techniques.

Embodiments of the present invention provide an economically feasible method of repair that allows indefinite postponement of the replacement of thousands of miles of gas pipeline, thereby preserving the enormous quantities of natural resources that would be required to fabricate replacement pipe. As many of these pipe joints and other discontinuities are sealed, the loss of natural or propane gas will be greatly reduced, as will the consumption of enormous amounts of glycol and other joint filler preserving compounds.

Other embodiments of the present invention comprises an automated system for pretreating a section of pipeline, removing an amount of debris there from, filling or bridging a gap, joint or other discontinuity found therein, and sealing the same as described herein.

A particular aspect of the invention is directed to a system for internally filling a joint or other discontinuity in a pipeline. The system includes a flexible conduit, a fill device removably connected to the flexible conduit, wherein the fill device is constructed and arranged to apply a fill material to an interior surface of said pipeline to fill one or more gaps in the pipeline, and a propulsion unit connected to at least one of the flexible conduit and the fill device that propels the flexible conduit through said pipeline.

The fill device can include a center carriage and at least one scraper coupled to the center carriage and constructed and arranged to contact an inner surface of the pipeline to move debris on the inner surface. The at least one scraper can be moveably mounted to the center carriage and constructed and arranged to be moveable between a retracted position and an activated position. The at least one scraper can be a plurality of scrapers. The system can further include an entry unit, coupled to the flexible conduit and coupled to the propulsion unit that is constructed and arranged to mate with a live pipeline. The fill device can be constructed and arranged to spray foam for filling gaps in a pipeline, and to spray a sealant to seal a gap in a pipeline. The fill device can be constructed and arranged to spray fill material in the presence of pressurized gas in the pipeline. The fill device can include a carriage having a first end and a second end, a spraying mechanism detachably connected to the first end of the carriage, and a plurality of adjustable legs, each having a first end and a second end, the first end connected to said carriage, and the second end constructed and arranged to contact an inner surface of the pipeline.

Another aspect of the present invention is directed to a method for internally filling a joint or other discontinuity in a live pipeline. The method includes attaching an insertion duct to the pipeline, inserting a filling unit through the insertion duct into the pipeline, the filling unit having a spraying mechanism to spray foam to fill the joint or discontinuity, orienting the filling unit in the pipeline adjacent to the joint or other discontinuity to be filled using a flexible conduit operatively attached to the filling unit, the conduit being sufficiently rigid to propel the filling unit, and the conduit being sufficiently flexible to maneuver around bends or other obstacles in the pipeline, and spraying an interior of the pipeline at a desired location with the foam.

The method can include spraying a sealant over the foam and clearing debris from an area of the pipeline around the joint or discontinuity prior to spraying the foam. Clearing debris can include activating at least one scraper coupled to the filling unit to contact the interior of the pipeline. The method can further include inserting a milling device into the pipeline through the insertion unit, and operating the milling device to treat an area around the joint or discontinuity.

Yet another aspect of the invention is directed to a system for internally filling a joint or other discontinuity in a pipeline. The system includes a flexible conduit, means, coupled to the flexible conduit, for applying a fill material to an interior surface of said pipeline to fill one or more gaps in the pipeline, and a propulsion unit connected to the flexible conduit that propels the flexible conduit through the pipeline.

The system can further include means for scraping debris from around the joint or other discontinuity, and means for inserting the means for applying into a live gas pipeline. The system can also include means, coupled to the flexible conduit, for applying a sealant over the fill material in the pipeline, and means for monitoring application of the fill material to the interior surface.

BRIEF DESCRIPTION OF THE DRAWINGS

For a better understanding of the present invention, reference is made to the drawings, which are incorporated herein by reference, and in which.

DETAILED DESCRIPTION

Figure 1:
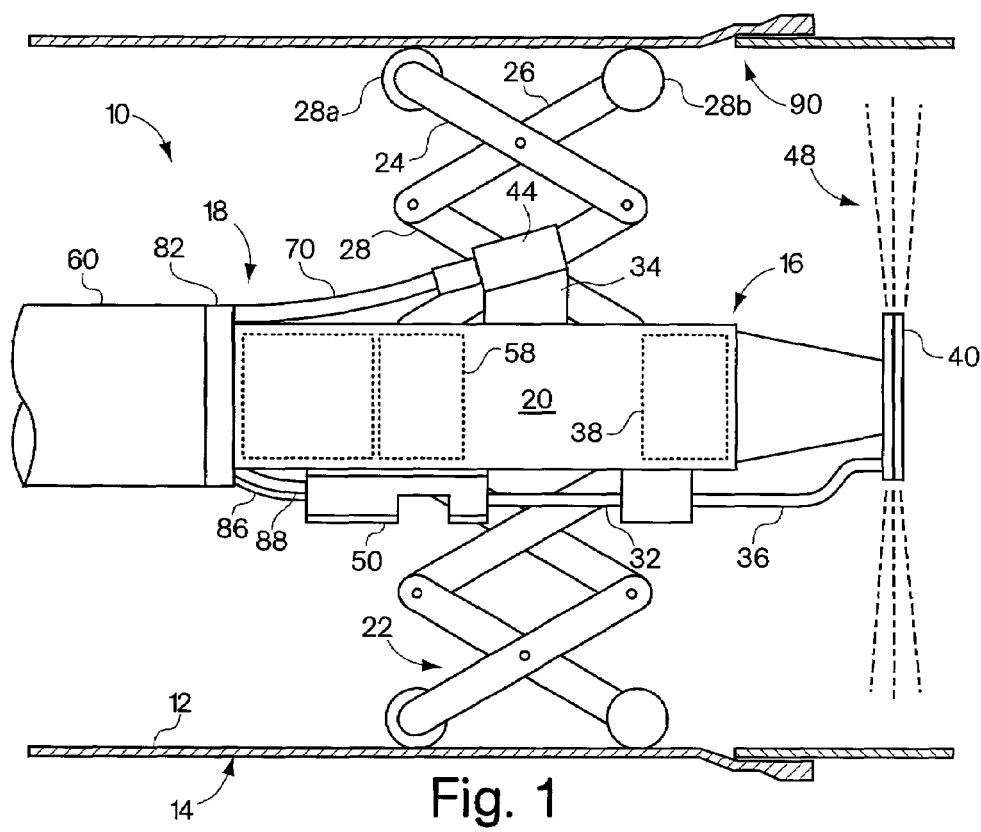
FIG. 1 is a detailed side view of a coating device and semi-flexible containment tube of one embodiment of the present invention showing the device situated inside a section of gas pipe.

One embodiment of the present invention will now be described with reference to FIGS. 1–12. Referring now to FIG. 1, a coating device, generally designated by numeral 10, is shown located resting on an inside surface 12 of a pipe 14. The coating device 10 is provided with a centering carriage 20. The centering carriage 20 has a front end 16 and a rear end 18. A manifold 82 is attached to the rear end 18. A containment tube 60 is shown attached to manifold 82. An air motor 38 is mounted inside the front end 16 of centering carriage 20. Air motor 38 turns a rotating slotted head 40. A static mixer 50 is fixed to the side of centering carriage 20. Individual coating material components are sent to the static mixer 50 through intake tubes 86 and 88 where they are thoroughly mixed to produce a coating material 48. The coating material 48 is then sent through an outlet tube 32 where it is forced into a spray tip 36. Spray tip 36 then meters an appropriate amount of coating material 48 into rotating slotted head 40, which centrifugally disperses coating material 48 onto the inside surface 12 of pipe 14.

The centering carriage 20 is provided with a plurality of adjustable-length scissor-type expansion legs 22 for support. Each scissor-type expansion leg 22 is attached to a compressed gas powered piston 58, which is mounted inside the rear end 18 of centering carriage 20. Wheel assemblies' 28a and 28b are attached to the ends of the adjustable-length scissor-type expansion legs 22. The wheel assemblies 28a and 28b are shown in contact with the inside surface 12 and allow for lateral movement of coating device 10 through pipe 14. The scissor-type expansion legs 22 are shown having four hinged members 24, 26, 28, and 30. The number of hinged members may be increased or decreased to accommodate different diameters of pipe 14.

An illuminating explosion-proof monitoring camera probe 44 is attached to centering carriage 20, by way of a monitoring probe mount 34. An explosion-proof camera probe cable 70 is attached at one end to the illuminating explosion-proof monitoring camera probe 44 and at the other end to a control console. The illuminating explosion-proof monitoring camera probe 44, which is powered by the explosion-proof camera probe cable 70, is positioned to allow an operator to locate sections of pipe 14 that require treatment by the coating device 10. The explosion-proof monitoring camera probe 44 lights the inside surface 12 of pipe 14, and relays images of the inside surface 12 back to the control console.

As the coating device 10 is progressed laterally through pipe 14 an operator is able to monitor joints or other discontinuities by viewing a monitor on the control console. The operator can remotely control the application of coating material 48 to the inside surface 12 of pipe 14. Upon discovery of a joint or discontinuity, a specific amount of coating material 48 is metered onto inside surface 12.

In one embodiment, a preferred coating material 48 is two-part epoxy-type elastomeric polyurethane sold under the name PLASITE PERMA-THANE 2300. Coating material 48 is capable of filling and coating large joints or other discontinuities. Coating material 48 can be used in a variety of environments including pressurized gas, air or oxygen. Depending upon the desired thickness of coating material 48 required, an operator can reposition coating device 10 and repeat the coating process described above.

Figure 2:
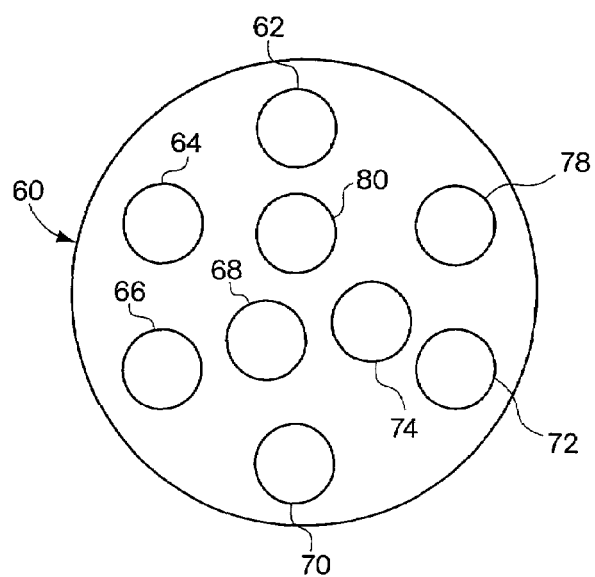
FIG. 2 is a cross-sectional view of the containment tube showing the different dedicated hoses, rods and tubes required for operation of the coating device shown in FIG. 1.

Referring now to FIG. 2, a cross-sectional view of containment tube 60 is shown. Containment tube 60 houses non-conductive sealant component hoses 62 and 64, compressed gas hoses 66, 68 and 78, sealed explosion-proof camera probe cable 70, exhaust hoses 72 and 74, and an optional flexible stabilizing rod 80. Containment tube 60 serves to protect the various hoses, tubes and rods it surrounds from abrasion. Also, containment tube 60 is flexible enough to maneuver around tight corners and bends in pipe, and is rigid enough to provide for the lateral movement of the coating device 10 in long lengths of pipe. Additionally, containment tube 60 serves to exhaust the gas used to power the air motor 38 and operate the scissor-type expansion legs 22 outside pipe 14.

The non-conductive sealant component hoses 62 and 64 provide the individual coating material components to the intake tubes 86 and 88, respectively. The compressed gas hose 66 provides compressed gas for manipulating piston 58, which controls the expansion and contraction of the scissor-type expansion legs 22. Compressed gas hose 68 is used for powering air motor 38, which in turn powers slotted spray head 40. The sealed explosion-proof probe cable 70 is used for powering, lighting and receiving information from explosion-proof monitoring probe 44. Exhaust hose 72 exhausts the compressed and other gases outside pipe 14. Compressed gas hose 78 supplies compressed gas for purging any unused sealant 48 from the coating device 10. The optional flexible stabilizing rod 80 provides for additional rigidity within containment tube 60 and allows for additional lateral force to be applied to the coating device 10.

Figure 3:
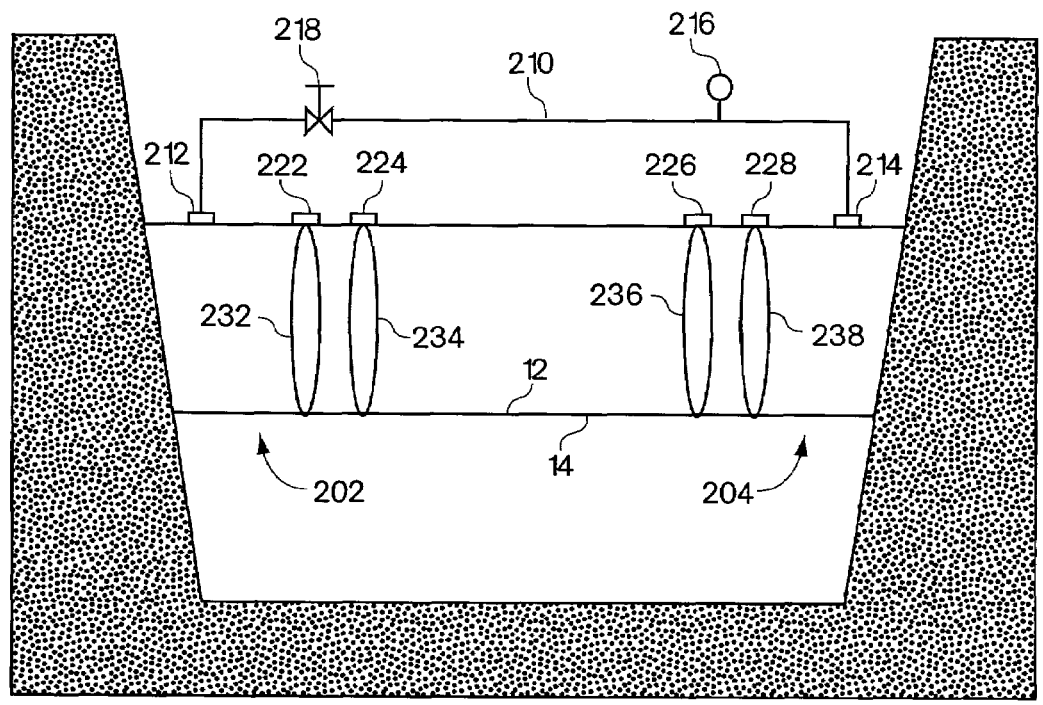
FIG. 3 is a schematic view of an excavation site showing an exposed length of gas pipe and a bypass system that allows the gas to remain flowing in the pipe.

Referring now to FIG. 3, a schematic view of an excavated section of live gas pipe 14, having a first section 202 and a second section 204 is shown. Tap holes 212 and 214 are drilled in sections 202 and 204 respectively. Next, a temporary bypass 210 is connected between drilled holes 212 and 214 to allow the gas to remain flowing in pipe 14 while a section is removed to allow for the insertion of coating device 10. The temporary by-pass 210 is equipped with a pressure gauge 216 and a shut-off valve 218.

Holes 222 and 224 are drilled, tapped and plugged in section 202 and holes 226 and 228 are drilled, tapped and plugged in section 204 of the excavated section of live gas pipe 14, between the drilled holes 212 and 214. The plugs are then removed from the drilled holes 222, 224, 226 and 228, and inflatable bladders 232, 234, 236 and 238 are inserted through the drill holes 222, 224, 226 and 228 respectively.

Inflatable bladders 232 through 238 are inflated to create a gas impermeable seal within pipe 14. Depending upon the pressure and the direction of the gas flowing in pipe 14, fewer or additional inflatable bladders may be employed to control the flow of gas in pipe 14. Opening the shut-off valve 218 diverts the flow of gas in pipe 14 through the temporary by-pass 210. With inflatable bladders 232, 224, 226 and 238 still inflated, a length of pipe located between inflatable bladders 234 and 236 is removed.

Figure 4:
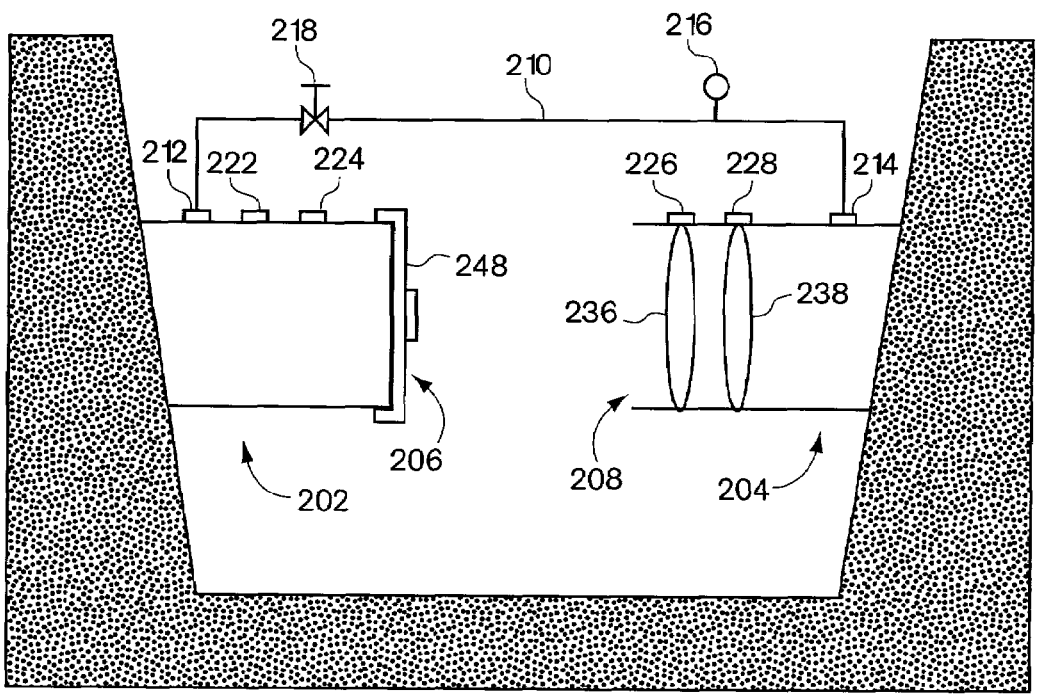
FIG. 4 is a schematic view of an excavation site showing a section of gas pipe removed and an end cap placed on an exposed end and a gas bypass system that allows the gas to remain flowing in the pipe.

Referring now to FIG. 4, the now exposed end 206 of section 202 is shown sealed off with cap 248. Inflatable bladders 232 and 234 may then be removed without allowing gas to escape from pipe 14. The gas in pipe 14 continues to flow through temporary by-pass 210.

Figure 5:
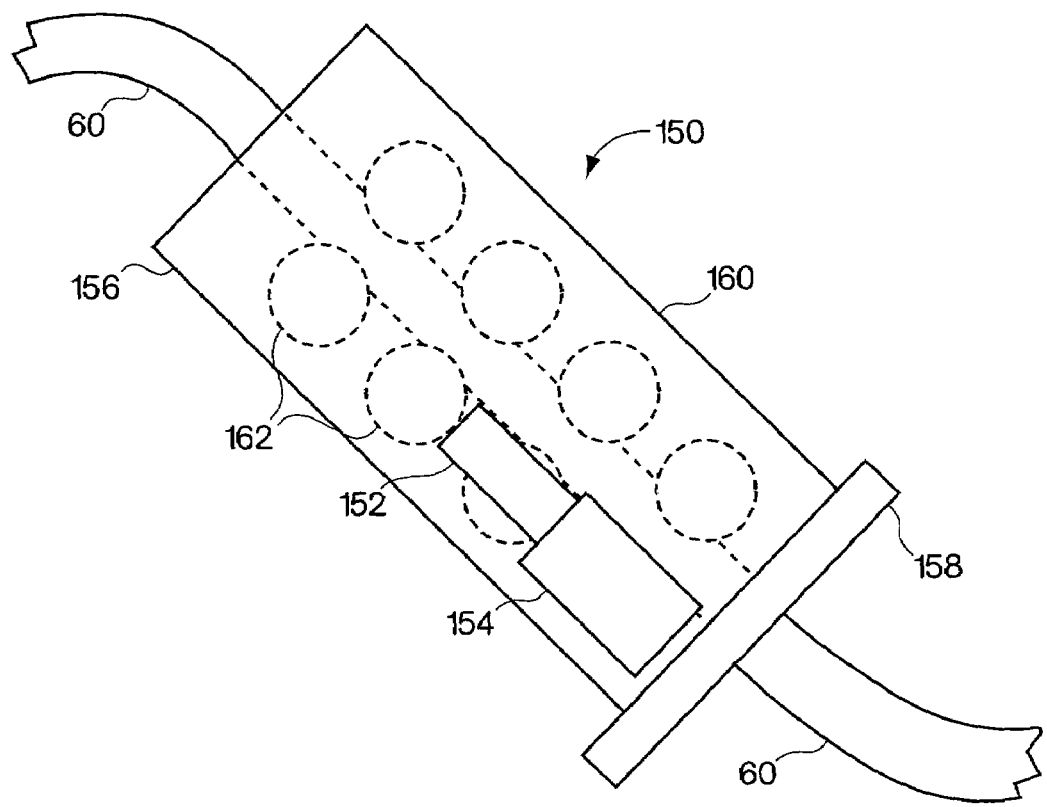
FIG. 5 is a side view of a containment tube-pushing unit of the present invention.

Referring now to FIG. 5 a pushing unit 150 is shown. FIG. 5 shows pushing unit 150 having a first end 156, a second end 158, and an outside surface 160. Pushing unit 150 controls the movement of containment tube 60 in pipe 14, which in turn controls the lateral movement of coating device 10. A power mechanism 154 is attached to outside surface 160. A control mechanism 152 is operatively connected to power mechanism 154 and controls the rate at which power mechanism 154 operates. Containment tube 60 is shown entering pushing unit 150 through first end 156 and exiting pushing unit 150 through second end 158. A plurality of flywheels 162 are powered by power mechanism 154 and operate to maneuver containment tube 60 through pushing unit 150 and into and out of pipe 14.

Figure 6:
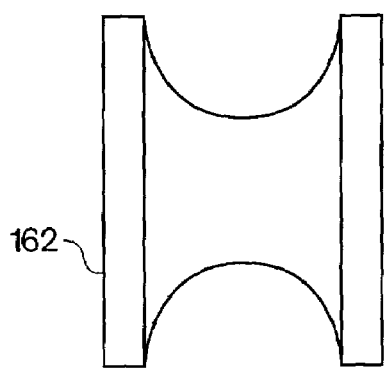
FIG. 6 is an enlarged side view of a fly drivewheel and idler wheel from the containment tube-pushing unit shown in FIG. 5.

FIG. 6 shows an enlarged side view of a single flywheel 162, having a curved inner surface for receiving containment tube 60.

Figure 7:
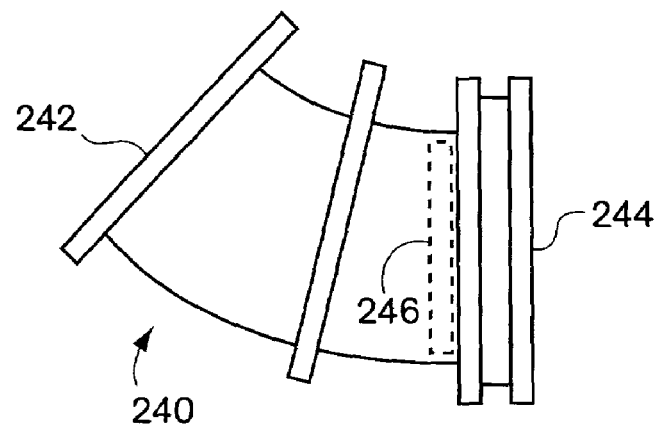
FIG. 7 is a side view of an entry unit used with embodiments of the present invention;.

Referring now to FIG. 7 a side view of a preferred insertion duct 240 is shown. Insertion duct 240 has a first end 242 and a second end 244. Insertion duct 240 is fitted with a gate-valve 246 in second end 244. Gate valve 246 closes to form a gas impermeable seal about containment tube 60, which permits containment tube 60 to pass through it while preventing gas from escaping from pipe 14. Insertion duct 240 is shown having a preferred curve shape. This design facilitates the insertion of containment tube 60 and coating device 10 into pipe 14 and allows for a smaller section of pipe 14 to be removed. A straight or other shaped insertion duct may also be used.

Figure 8:
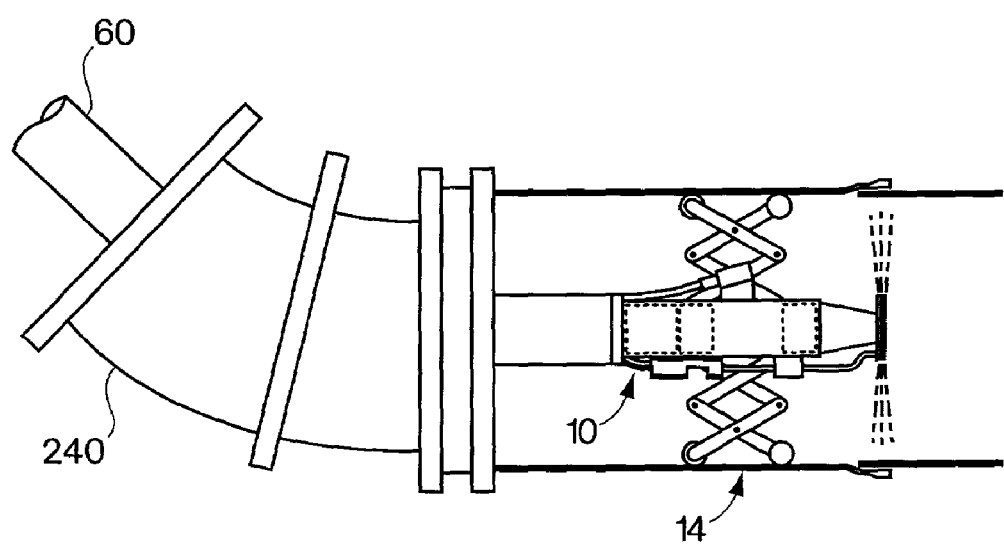
FIG. 8 shows the entry unit as shown in FIG. 7 attached to a gas pipe with a coating apparatus of the present invention resting within the gas pipe.

Referring now to FIG. 8 insertion duct 240 is shown attached to a section of gas pipe 14. Coating apparatus 10, as shown in FIG. 1, is shown situated in pipe 14.

Figure 9:
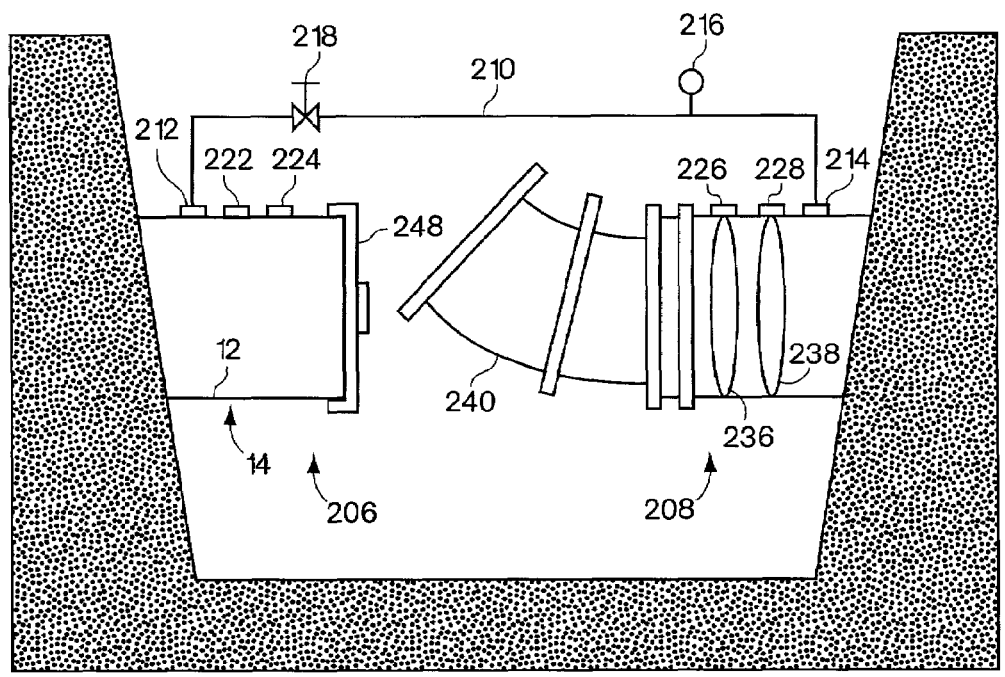
FIG. 9 is a schematic view of an excavation site showing the entry unit shown in FIG. 7 attached to an exposed end of gas pip;.

Referring now to FIG. 9, second end 244, of insertion duct 240, is shown bolted or otherwise fastened to the now exposed end 208 of pipe 14.

Figure 10:
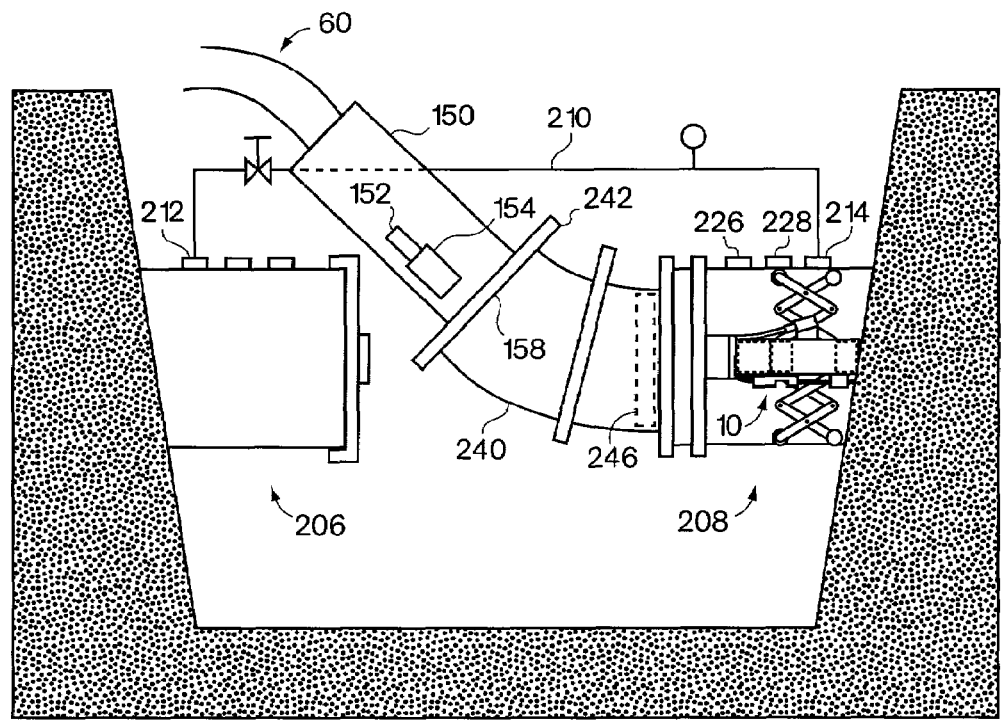
FIG. 10 is a schematic view of an excavation site showing the containment tube pushing unit shown in FIG. 5 attached to the entry unit as shown in FIG. 7.

Referring now to FIG. 10, second end 158, of pushing unit 150, is shown attached to first end 242 of insertion duct 240. Prior to bolting or otherwise fastening pushing unit 150 to insertion duct 240, containment tube 60 is inserted through pushing unit 150 and attached to coating device 10. Coating device 10, attached to containment tube 60, is then inserted into first end 242 of insertion duct 240, through gate-valve 246 and into pipe 14. Second end 158 of pushing unit 150 is then secured to first end 242 of insertion duct 240. After pushing unit 150 is secured to insertion duct 240 inflatable bladders 236 and 238 are deflated and removed and drill holes 226 and 228 are plugged.

An operator can then laterally relocate coating device 10 hundreds of feet down pipe 14 away from section 204 to a desired location with control unit 152. Control unit 152 adjusts the rate of speed of power mechanism 154, which in turn controls the speed of flywheels 162. Flywheels 162 feed containment tube 60 into pipe 14, which laterally moves coating device 10. The operator can then monitor the inside surface 12 of pipe 14 using the images sent back along explosion-proof camera probe cable 70 from the explosion-proof monitoring camera probe 44.

Once a joint or other discontinuity has been located the operator may then remotely apply coating material 48. The operator controls the thickness of coating material applied to inside surface 12 by controlling both the rate of lateral movement of coating device 10 and by controlling the flow rate of the individual sealant components. When the operator has finished coating and sealing a section of pipe 14 with coating material 48, the static mixer 50, the spray tip 36, the outlet tube 32 and the rotating slotted head 40 may be purged of coating material 48 by forced compressed gas provided by compressed gas purging line 78.

Once the desired length of pipe 14 leading away from section 204 is sealed, pushing unit 150, insertion duct 240 and coating device 10 are removed in reverse order as above-described and an end cap 248 is placed over exposed end 208.

To seal the length of pipe 14, leading away from exposed end 202, drill holes 236 and 238 are unplugged and inflatable bladders 236 and 238 are reinserted and inflated. End cap 248 is removed from section 202 of pipe 14 and insertion duct 240 is mounted to exposed end 206 in its place. Coating apparatus 10 is then inserted into section 202 and pushing unit 150 is attached to insertion duct 240. The inspection and treating procedure is the same as described above.

Figure 11:
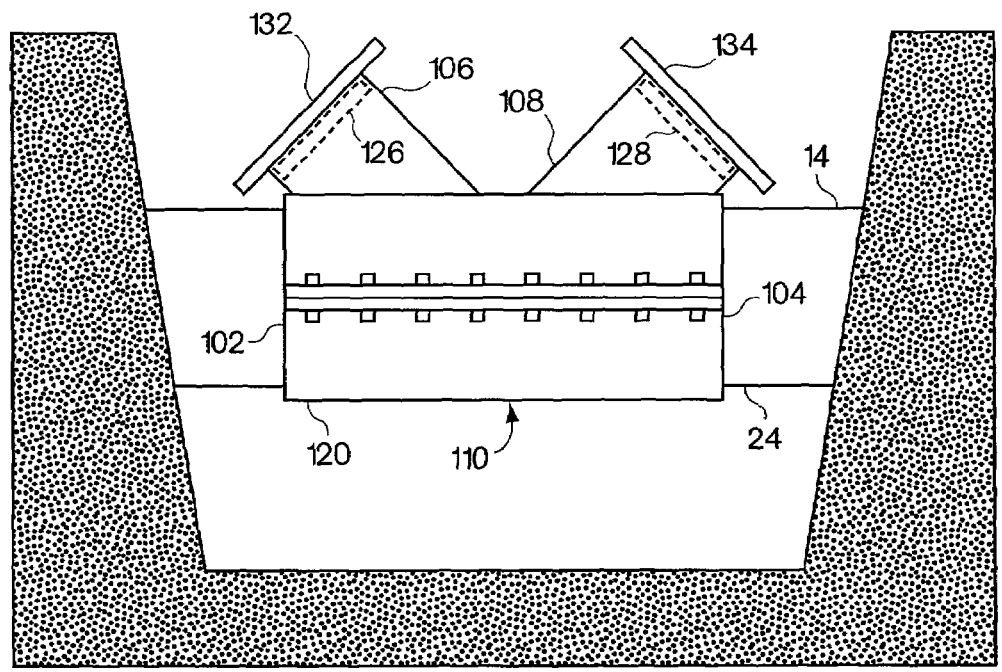
FIG. 11 is a schematic view of an excavation site showing a split sleeve dresser entry unit of one embodiment of the present invention attached to a gas pipe.
Figure 12:
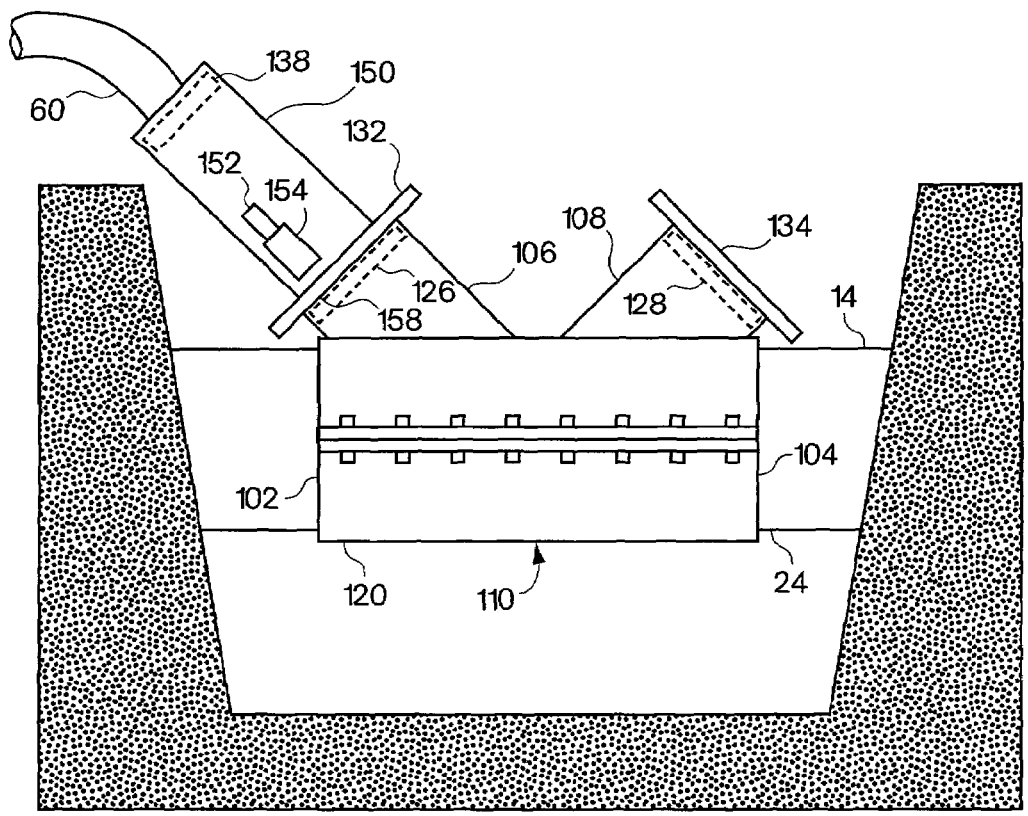
FIG. 12 is a schematic view of an excavation site showing the containment tube-pushing unit shown in FIG. 5 attached to the split sleeve dresser shown if FIG. 11.

Referring now to FIGS. 11 and 12, a second method is revealed for inserting coating device 10 into live gas pipe 14. FIG. 11 depicts an excavated section of live gas pipe 14. A two-piece split-sleeve dresser 110, having a first end 102 and a second end 104, is put in place and bolted around the outer circumference 24 of a section of live gas pipe 14. Angled sections 106 and 108, containing gate valves 126 and 128 respectively, are then attached to an outer surface 120 of the split-sleeve dresser 110.

FIG. 12 shows pushing unit 150 attached to angled section 106. Pushing unit 150 controls the lateral movement of coating device 10 in the same manner as described above. Once the desired length of pipe 14 has been treated and inspected using coating device 10, then the coating device may be removed from pipe 14.

Prior to the attachment of pushing unit 150, a drilling unit is mounted to a faceplate 132 of angled section 106. Gate valve 126, located within angled unit 106, is opened as the drilling unit drills a hole 142 (not shown) through the two-piece split-sleeve dresser 110 and into pipe 14, at the point where angled section 106 and split sleeve dresser 110 intersect. Hole 142 is large enough to allow coating device 10, attached to containment tube 60, to be inserted into pipe 14. Gate valve 126 is then closed and the drilling unit is removed.

Containment tube 60 is threaded through pushing unit 150 and attached to coating device 10. Coating device 10 is then inserted into angled section 106. Second end 158 of pushing unit 150 is then bolted or otherwise fastened to face plate 132 of angled section 106. An inflatable packing gland 138 is then inserted into pushing unit 150 and is positioned around containment tube 60, to form a gas impermeable seal. Inflatable packing gland 138 prevents gas from escaping pipe 14 while allowing containment tube 60 to pass through hole 142 into pipe 14. Once inflatable packing gland 138 is in place, gate valve 126 is opened and coating device 10 is pushed through hole 142 and into pipe 14.

A length of gas pipe section leading away from split sleeve dresser end 104, may be inspected and treated in the same manner as described above. First, an operator relocates the coating device 10 the desired distance down pipe 14. The operator then maneuvers the coating device 10 back to the split sleeve dresser 110 inspecting and coating joints or other discontinuities along the way. After the section of pipe leading away from split sleeve dresser end 104 has been treated, the coating device 10 is returned to angled section 106. Gate valve 126 is closed and the pushing unit 150 is removed. A cap 136 (not shown) is then bolted or otherwise fastened to face plate 132.

In order to inspect and treat the section of gas pipe extending away from split sleeve dresser end 102, a hole 144 (not shown) similar to hole 142, is cut into pipe 14, within angled section 108 and through the two-piece split-sleeve dresser 110. Hole 144 is large enough to allow coating device 10, attached to containment tube 60, to be inserted into pipe 14. Coating device 10 is then inserted through angled section 108 through hole 144 and into pipe 14. After the section of gas pipe extending away from split sleeve dresser end 102 has been inspected and treated, and coating device 10 has been removed, a cap 146 (not shown) is secured to face plated 134. After both sections of pipe 14, leading away from the split sleeve dresser 110 have been inspected and treated, and angled sections 106 and 108 have been capped, the split sleeve dresser 110 is left in place and the excavation is filled in.

Depending upon the amount of build up of debris on inside surface 12 of pipe 14, a cleaning device may be attached to containment tube 60 and fed through pipe 14 using the same methods as described above to recondition the pipe. Preferred cleaning devices are self-centering, powered by compressed air, and are explosion proof. After reconditioning, the cleaning device is removed to allow for the insertion of coating device 10.

In embodiments described above, a self-propelled coating device is inserted in pipeline to seal discontinuities in pipelines. The embodiments described above are particularly useful for sealing relatively small discontinuities in pipelines. As will now be described, in additional embodiments of the present invention, apparatus and processes are provided that are particularly useful for filling larger dimension and unique gaps. At seams in pipelines, relatively large gaps can form. When multiple coats of sealant are applied to large gaps, an effect known as telegraphing can occur where the crack gets deeper without the sealant ever filling it or bridging across it. In embodiments of the invention described below, prior to the application of sealant to a gap, a filler is applied to the gap, allowing the sealant to smoothly bridge the gap. Further, in embodiments described below, using apparatus of the present invention, debris can be removed from a pipeline prior to the application of filler and/or sealant for the purpose of exposing the pipe wall in order to provide a surface for adhesion and sealing.

Figure 13:
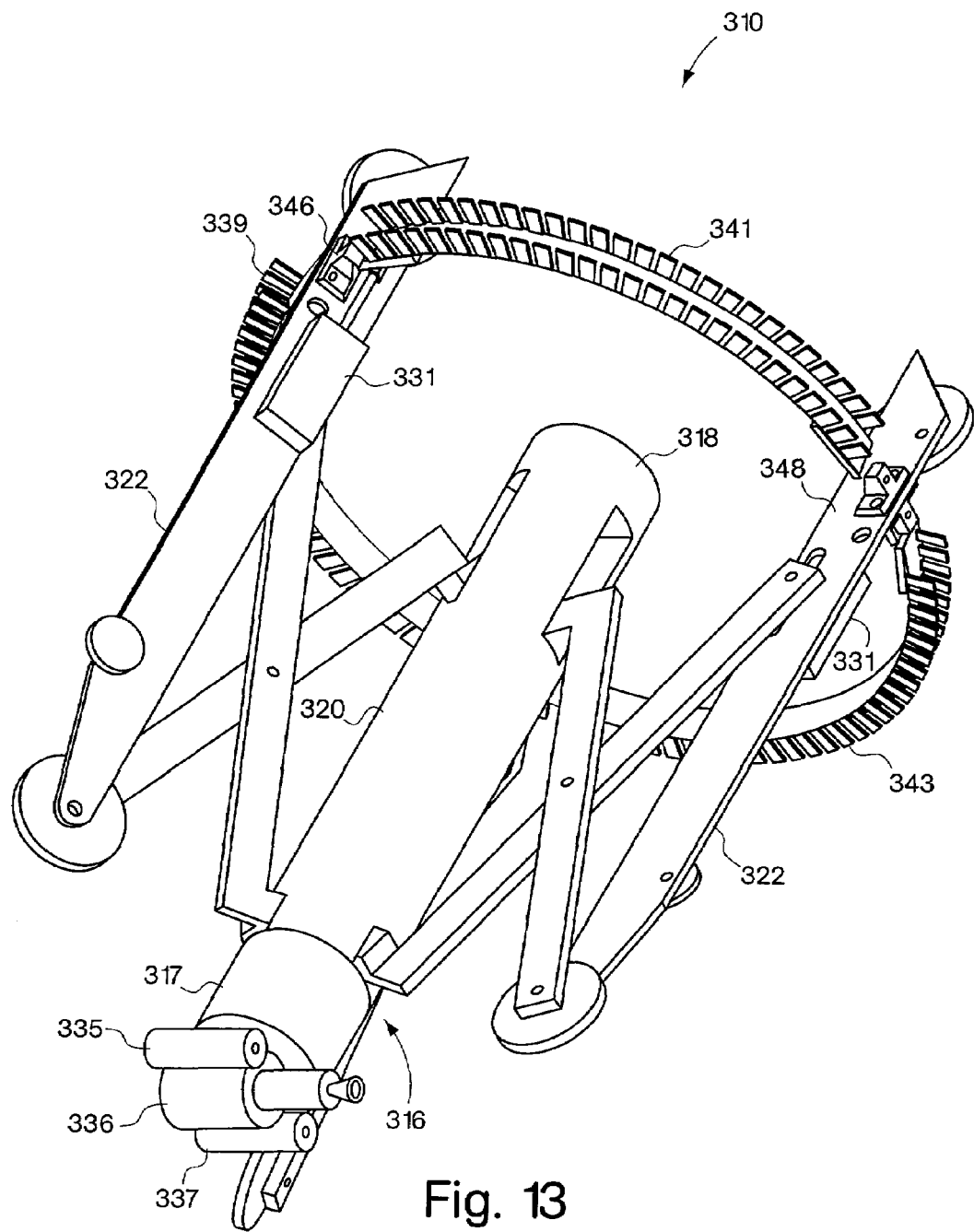
FIG. 13 is a perspective view of a device in accordance with another embodiment of the present invention with scraper blades in an activated state.
Figure 14:
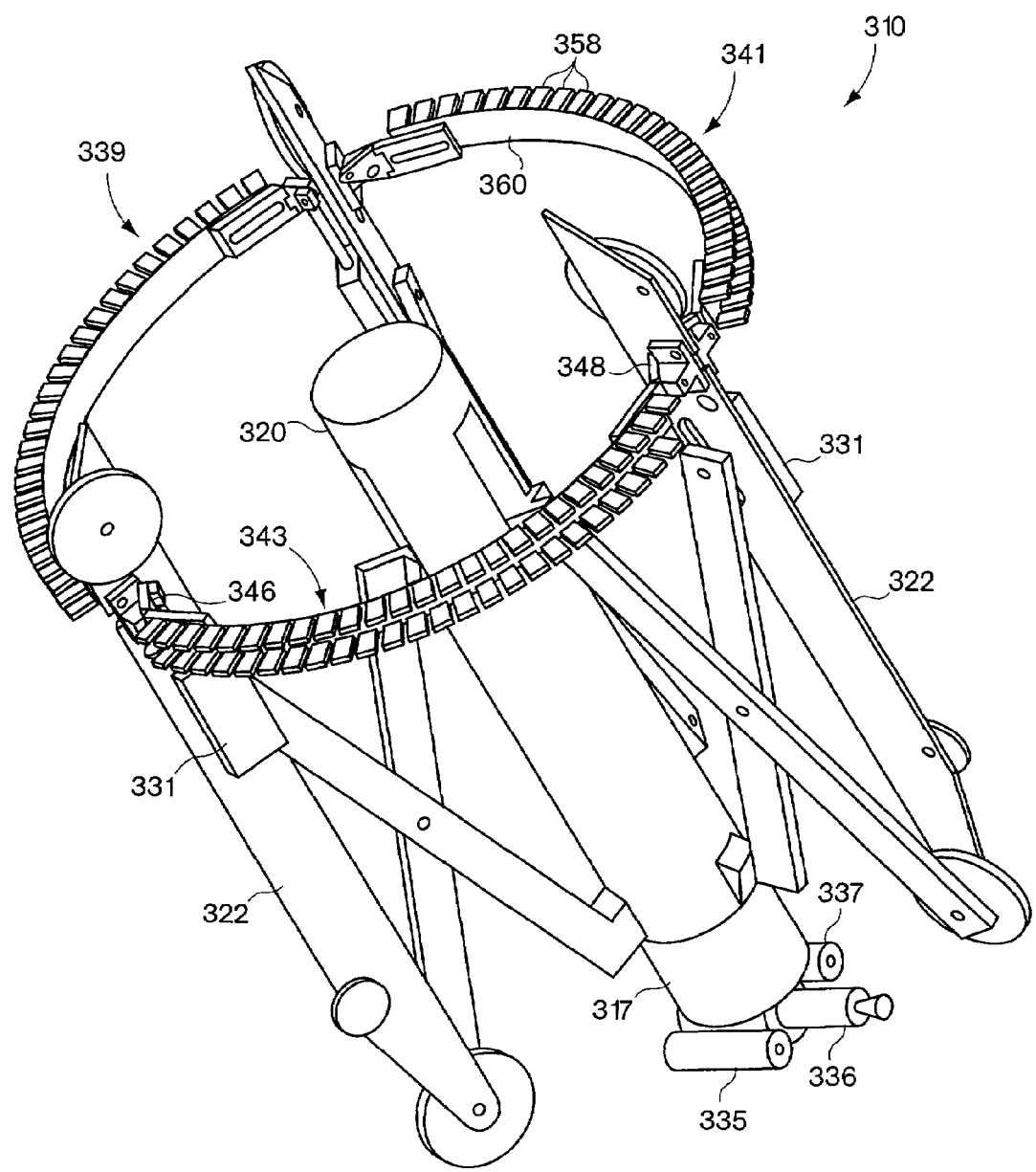
FIG. 14 is a second perspective view of the device of FIG. 13.

Referring to FIGS. 13 and 14, a debris mover and gap-bridging device 310 in accordance with one embodiment of the present invention will now be described. The device 310 may be coupled to a containment tube (also referred to herein as an umbilical) and propulsion device, like those described above, to allow the device 310 to be inserted into and propelled through a pipeline. The device 310 includes a centering carriage 320 having a front end 316 and a rear end 318. The manifold of a containment tube, like manifold 82 described above, couples to the rear end 318. The device also includes three adjustable-length scissor-type expansion legs 322, a spray head 336, blade actuators 331, a laser 335, a camera 337, and scraper blades 339, 341 and 343. In addition, as understood by those skilled in the art, control cables (not shown for clarity) extend from the umbilical to devices mounted on device 310 for monitoring and controlling the devices.

The expansion legs 322 are similar to expansion legs 22 described above and operate in the same manner to provide support for device 310 in a pipeline and to center the device in the pipeline. As in the previous embodiments, the expansion legs are retractable to facilitate insertion of the device into a pipeline. The expansion legs are shown in an expanded state in FIGS. 13 and 14 and in a retracted state in FIGS. 17 and 18.

The spray head is coupled to the centering carriage 320 using a motor/rotary union 317 that in one embodiment provides for 360-degree rotation of the spray head in a single rotational direction. In other embodiments, the motor/rotary union can reciprocate, rotating in one direction and then the other. The laser 335 and camera 337 are mounted to the spray head. The camera is coupled through the containment tube to a controller mounted outside of the pipeline to provide an operator with images of the interior of a pipeline, and the laser, also controlled by the controller, is used to provide illumination of the interior of the pipeline. Electrical signals and power for the spray head are provided though a slip-ring built into the rotary union.

Figure 15:
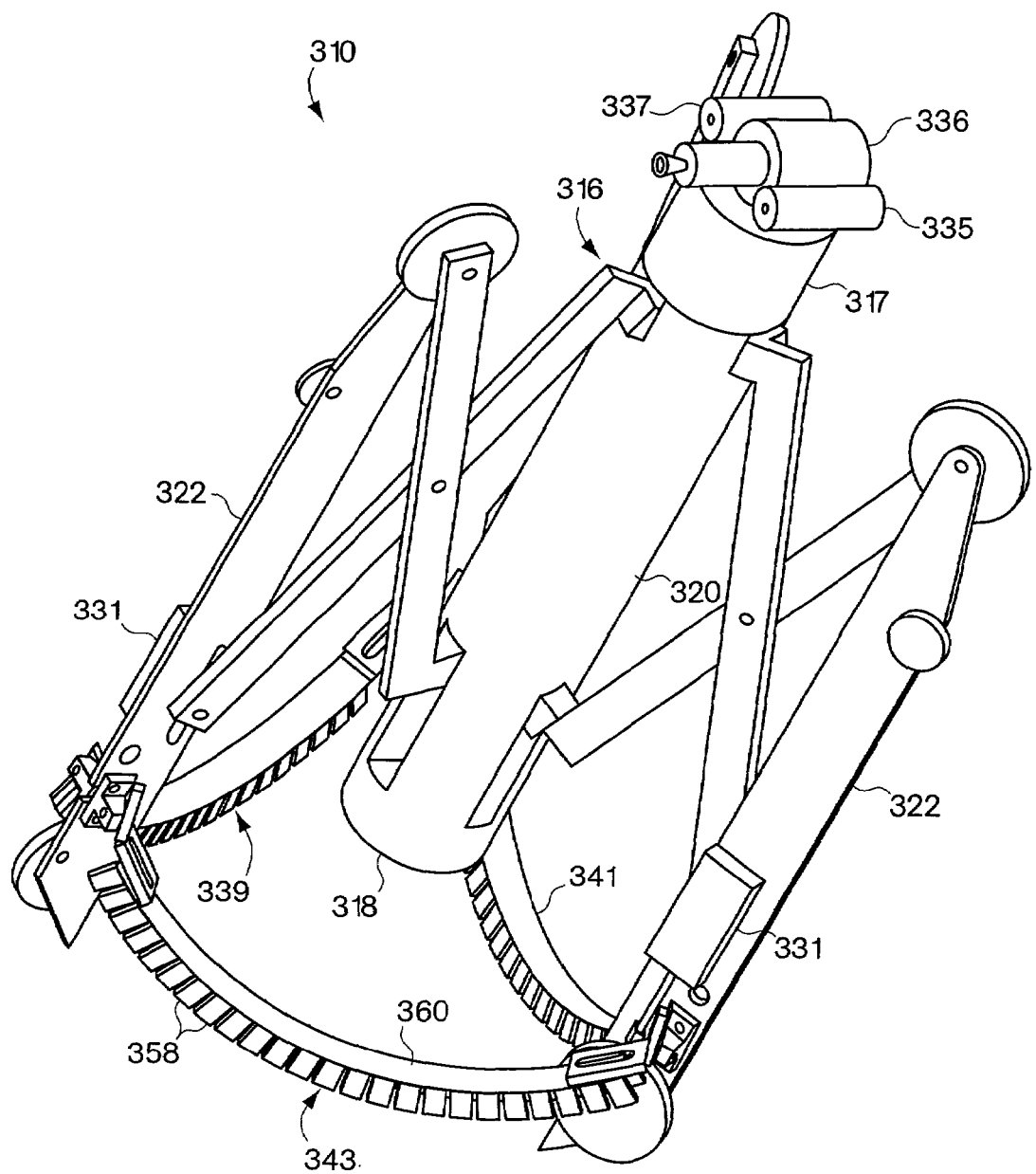
FIG. 15 is a perspective view of the device of FIG. 13 with the scraper blades in a retracted position.
Figure 16:
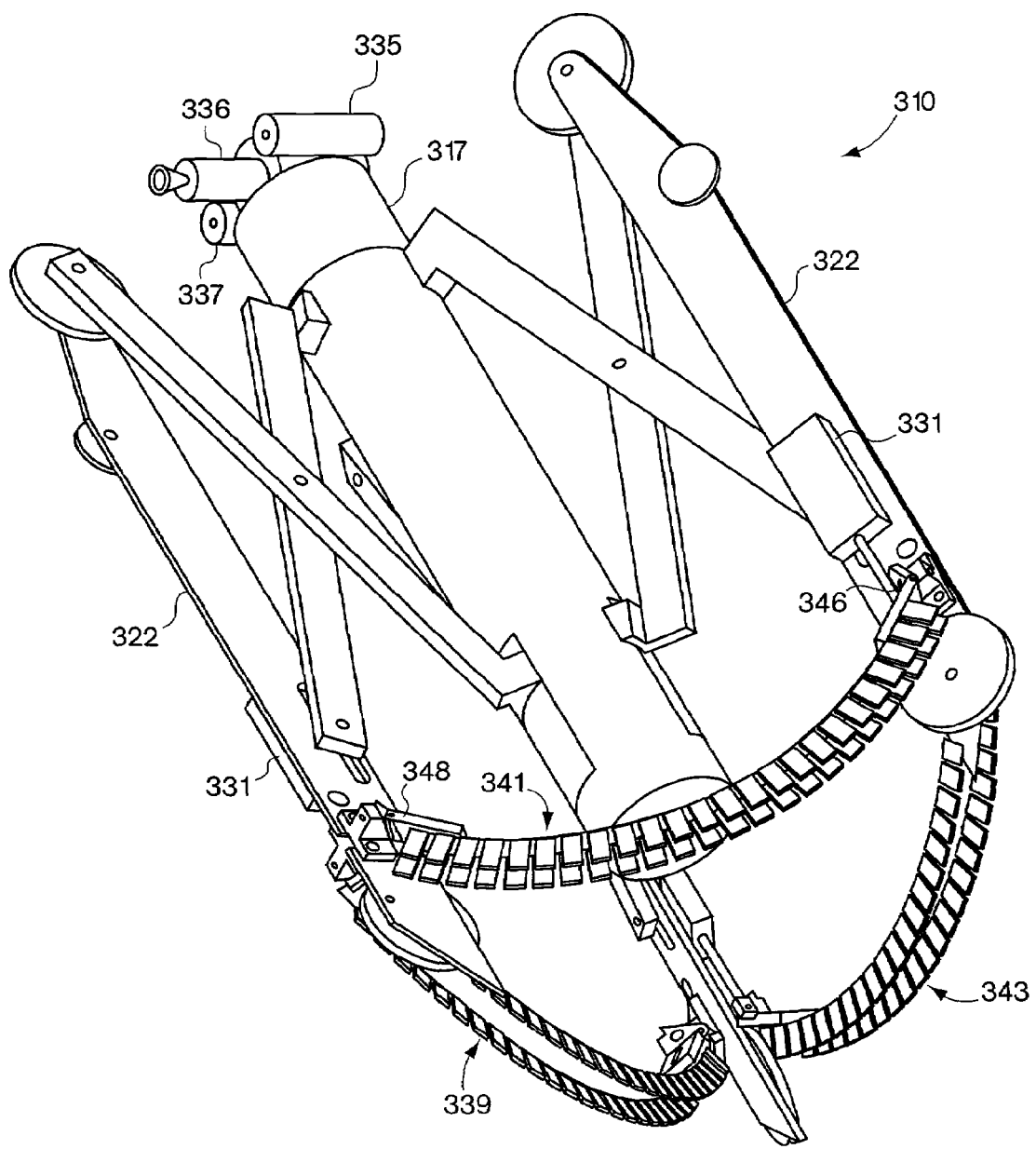
FIG. 16 is a second perspective view of the device of FIG. 13 with the scraper blades in the retracted position.

Each of the scraper blades 339, 341 and 343 are coupled to two of the expansion legs using first hinges 346 for one end of the blades and second hinges 348 for the other end of the blades. The first hinges 346 are coupled to one of the actuators 331 though a piston. The actuators use the pistons to move the scraper blades between a folded position shown in FIGS. 15 and 16 and the activated state shown in FIGS. 13 and 14. In the embodiment shown in FIGS. 13–16, each of the scraper blades includes two rows of teeth 358 mounted on a frame 360. The scraper blades are sized such that in the activated state, the three blades combine to form a substantially circular scraper having an outer diameter that is approximately equal to the inner diameter of a pipeline. In one embodiment, the material used to make the blades is stainless steel spring steel, and the blades are manufactured by cutting the tooth pattern from flat stock stainless steel, and then bending up the teeth and spring tempering the blades.

Figure 17:
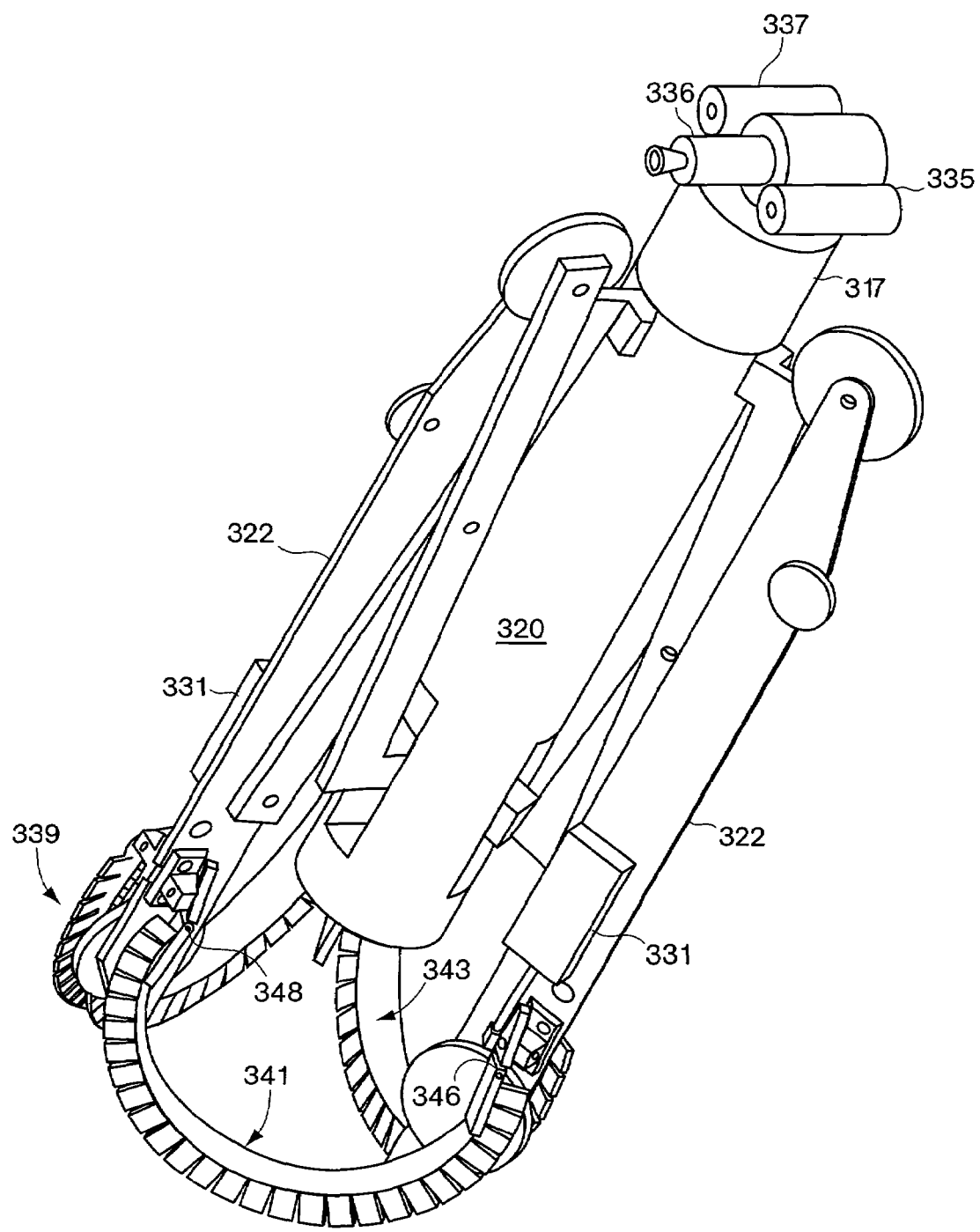
FIG. 17 is a perspective view of the device of FIG. 13 with extension legs and the scraper blades in an insertion mode.
Figure 18:
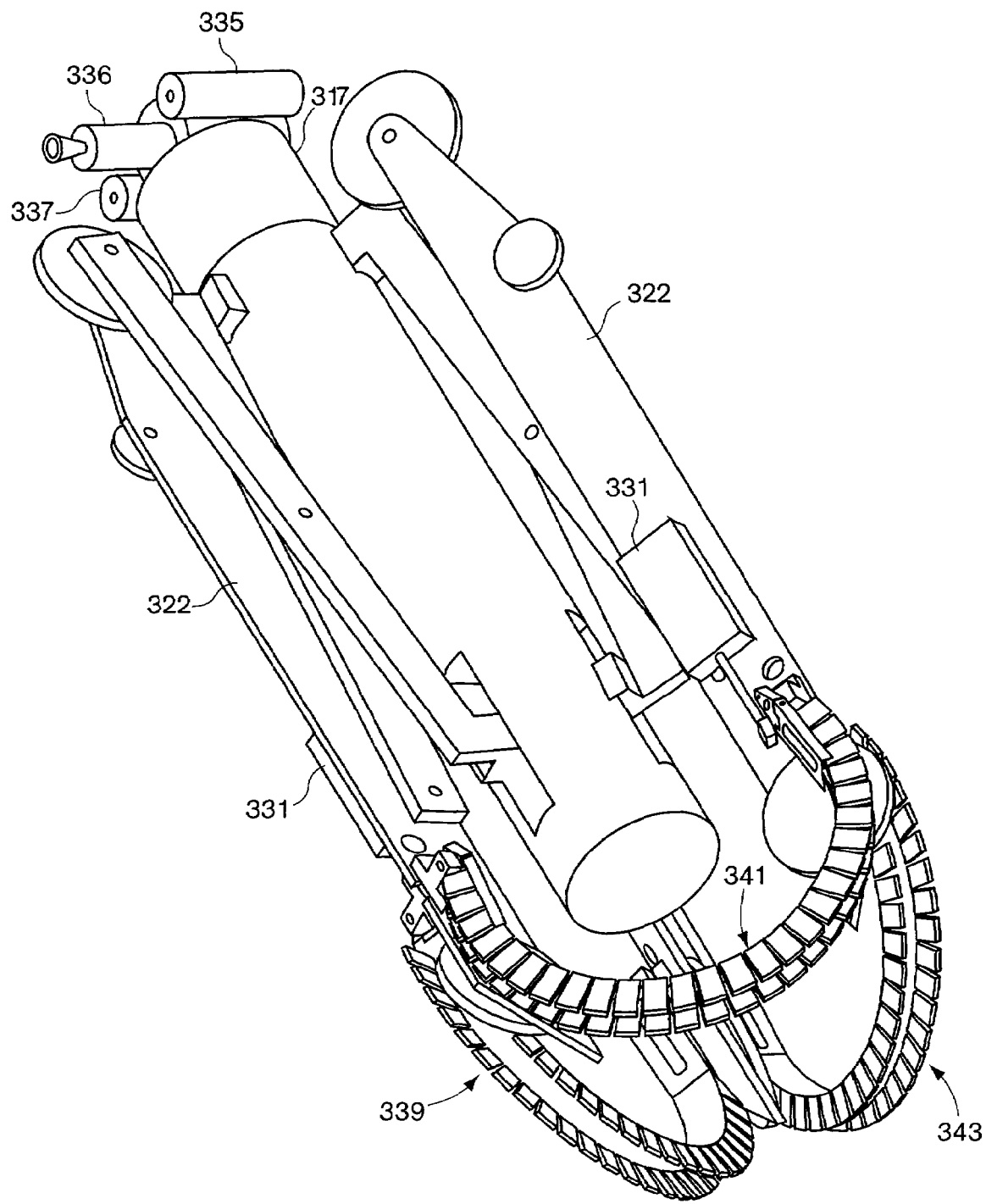
FIG. 18 is a second perspective view of the device of FIG. 13 with the extension legs and the scraper blades in the insertion mode.

When the expansion legs are in the retracted state, as shown in FIGS. 17 and 18, the scraper blades become further bent to allow the device 310 to be inserted into pipelines using an insertion tube having a diameter smaller than the diameter of the pipeline. In one embodiment of the present invention, an insertion device having a diameter of 12 inches is used for pipelines having inner diameters from 16 to 24 inches, so the device 310 is collapsible to a diameter much smaller than the pipeline for which it is designed for use. The thin stainless steel used for the frame 360 and separable teeth 358 allows the scraper blades to have sufficient rigidity when activated yet be flexible enough to bend inward with the retraction of the expansion legs. The flexibility of the scraper blades is also advantageous in the activated states in that it allows the scraper blades to bend with the expandable legs to adjust for non-uniform pipes.

Figure 19:
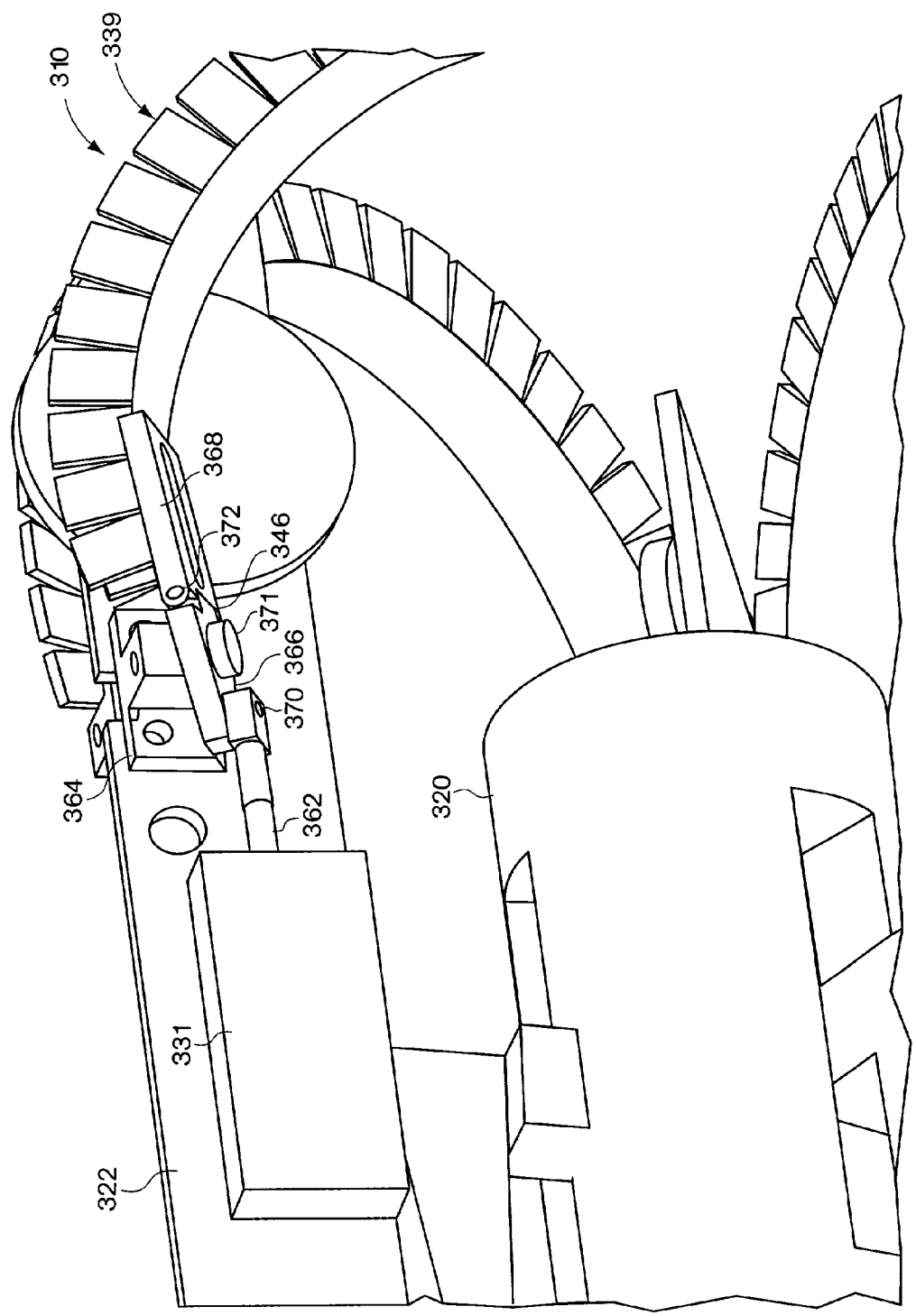
FIG. 19 is a close-up view of a hinge mechanism of the device of FIG. 13.
Figure 20:
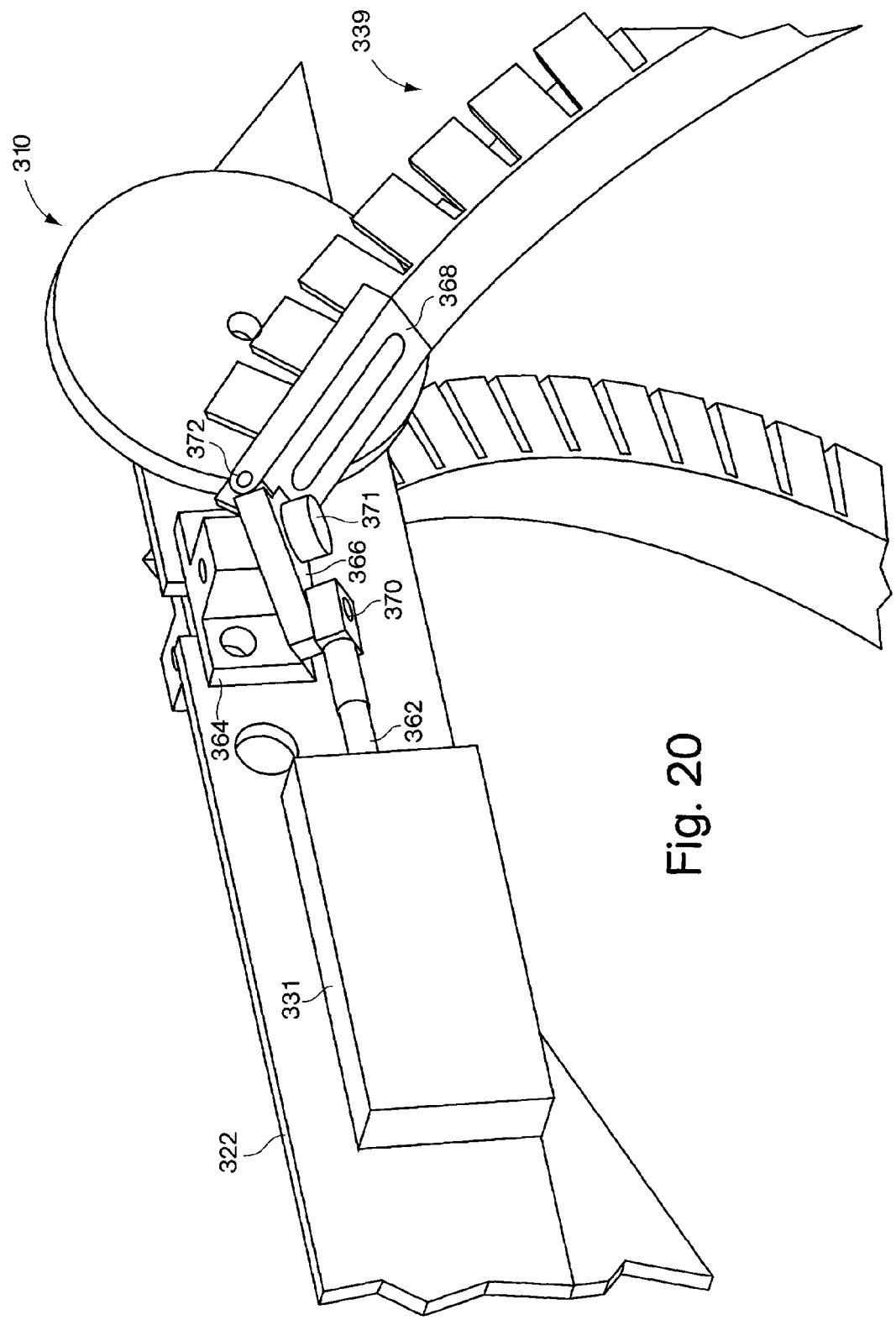
FIG. 20 is a second close-up view of the hinge mechanism of the device of FIG. 13.
Figure 21:
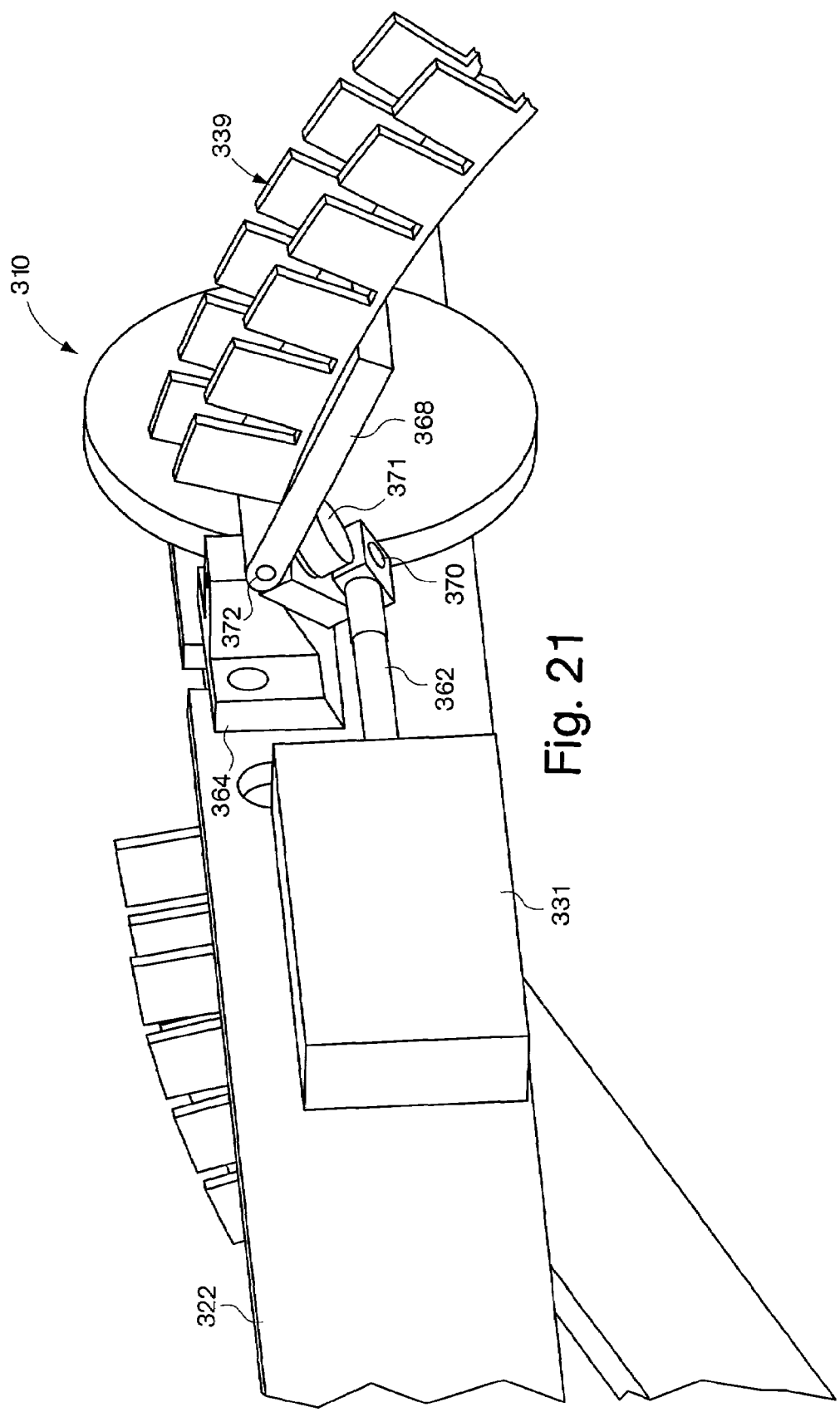
FIG. 21 is a third close-up view of the hinge mechanism of the device of FIG. 13.
Figure 22:
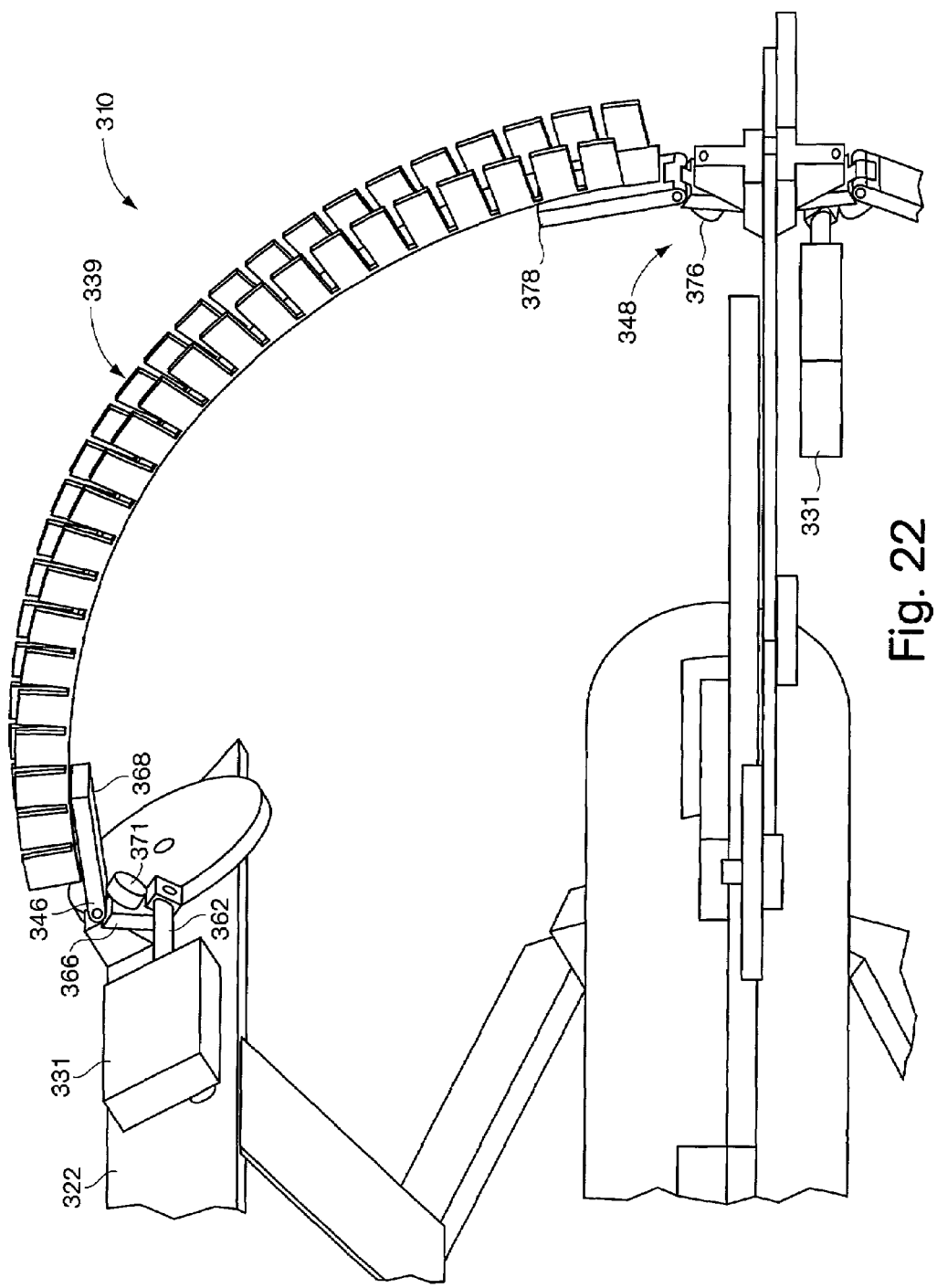
FIG. 22 is a fourth close-up view of the hinge mechanism of the device of FIG. 13.

The operation of the activators 331 and associated hinges 346, 348 for moving the scraper blades will now be discussed with reference to FIGS. 19–23, which provide partial, close-up views of the activators and hinges. In FIG. 19, the device 310 is in the insertion mode with the legs in the retracted state and the scraper blades retracted and bent, in FIG. 20, the device 310 is in the travel state with the legs extended and the blades retracted, and in FIG. 21, the device 310 is in the scrape mode with the legs extended and the scraper blades in the activated state. With reference to FIG. 19, each actuator 331 is coupled to a piston 362, which in turn is rotatably coupled at a first pivot point 370 to a first section 366 of one of the first hinges 346. The first section 366 of the first hinge 346 is coupled to a second section 368 of the first hinge 346 at a second pivot point 372. Each scraper blade is coupled to the second section 368 of the first hinge. The first hinge 346 is coupled to the leg 322 using a mounting block 364. The first hinge is coupled to the mounting block 364 using a screw 371, which also functions as a third pivot point for the first hinge. Each mounting block 364 supports the first hinge for one scraper blade and the second hinge for an adjacent scraper blade. Each of the second hinges (as best seen in FIG. 22) includes a first section 376 and a second section 378. The second hinges are substantially identical to the first hinges, except that the second hinges are not coupled to an actuator through a piston.

The actuators and hinges operate to control the scrapers as follows. The actuators 331 are coupled to the controller outside of the pipeline through air lines (not shown). The actuators have a retracted position and an extended position, and in one embodiment of the invention, the actuators are implemented using an air cylinder actuator, such as that manufactured by Festo Corporation of Hauppauge, N.Y., under part no. DZF-1/2-1-A-PA. In the insertion state and in the retracted/travel state of the device 310, the actuators are in the retracted position as shown in FIGS. 19 and 20, while in the activated state of the device 310, the actuators are in the extended position. In the insertion state, the combination of the flexibility of the scrapers and the tension on the scrapers caused by the folding of the expansion legs, causes the scrapers to be retracted and bent, so that the device can be inserted into a pipeline. In this state, as shown in FIG. 19, the first section 366 of hinge 346 is rotated to be substantially parallel with the piston 362, and the second section 368 of the hinge 346 is rotated to be substantially parallel with the first section 366.

Figure 23:
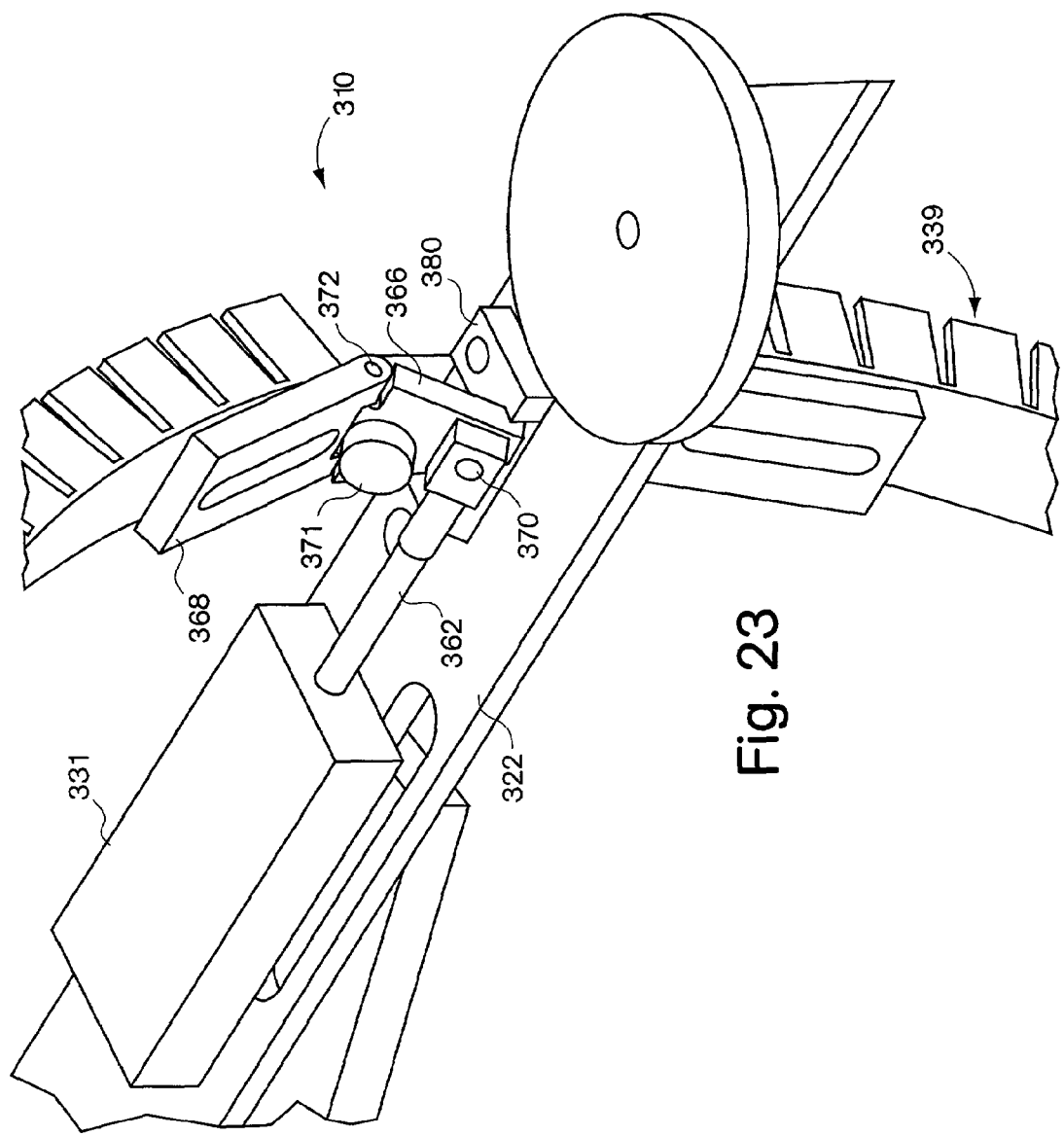
FIG. 23 is a fifth close-up view of the hinge mechanism of the device of FIG. 13.

When the expansion legs are moved to the travel state, as shown in FIG. 20, this causes the second hinge section 368 to rotate at pivot point 372, and also causes a slight rotation of the first hinge section 366 at point 370. The amount of rotation that occurs is dependent on the dimensions of each of the parts, but in embodiments of the invention, when the legs are extended, the scrapers still remain retracted until the actuator is actuated. When the actuator is controlled to move to the extended position, then the piston 362 extends causing the hinge 346 to move. The force caused by the movement of the piston causes the first section 366 of the hinge to rotate at pivot point 370 and causes the second section of the hinge 368 to rotate at pivot point 372, as shown in FIG. 21, thereby causing the scraper blade 339 to move to the extended position. In the embodiment shown, the hinge 346 rotates 90 degrees at pivot point 370. The design of the hinges and scrapers provides for rotation of each of the scrapers using only one actuator. Rotation of the second hinges 348 are caused by the translation of the scrapers due to the extension of the pistons, as shown in FIG. 22. As shown in FIG. 23, the mounting block 364 has a stop 380 that limits the movement of the first section 366 when pushed by the piston 362. The stop 38 is positioned to keep the second section, and therefore the scraper, perpendicular to the centerline of the device 310. Further, during the scraping action by the scrapers on the inside wall of a pipeline, the stop 380 maintains the scraper substantially perpendicular to the centerline.

The spray head 336 is configured to spray a two-part, expandable, urethane foam 360 degrees within a pipeline to fill gaps in the pipeline. In one embodiment, the spray head includes a plural-component air purge spray gun available from Gusmer Corporation of Lakewood, N.J. under the trade name GAP. In the embodiment shown in the drawings, the gun is mounted at a right angle to the centerline of the carriage to cause the foam to be sprayed on the walls of the pipe. In other embodiments, the spray gun is mounted along the centerline, and a right angle adapter is added to the output of the spray gun to cause the material to contact the inner surface of a pipe. In one embodiment, the material used with the spray head is a two part foam that is supplied to the spray head through the umbilical using two separate feed hoses, and the spray gun is designed to receive the two feed hoses and mix the final compositions within the gun. In one embodiment, the material used is available from Preferred Foam Products of Trenton, N.J., under part no. 9800-2506.

Figure 24:
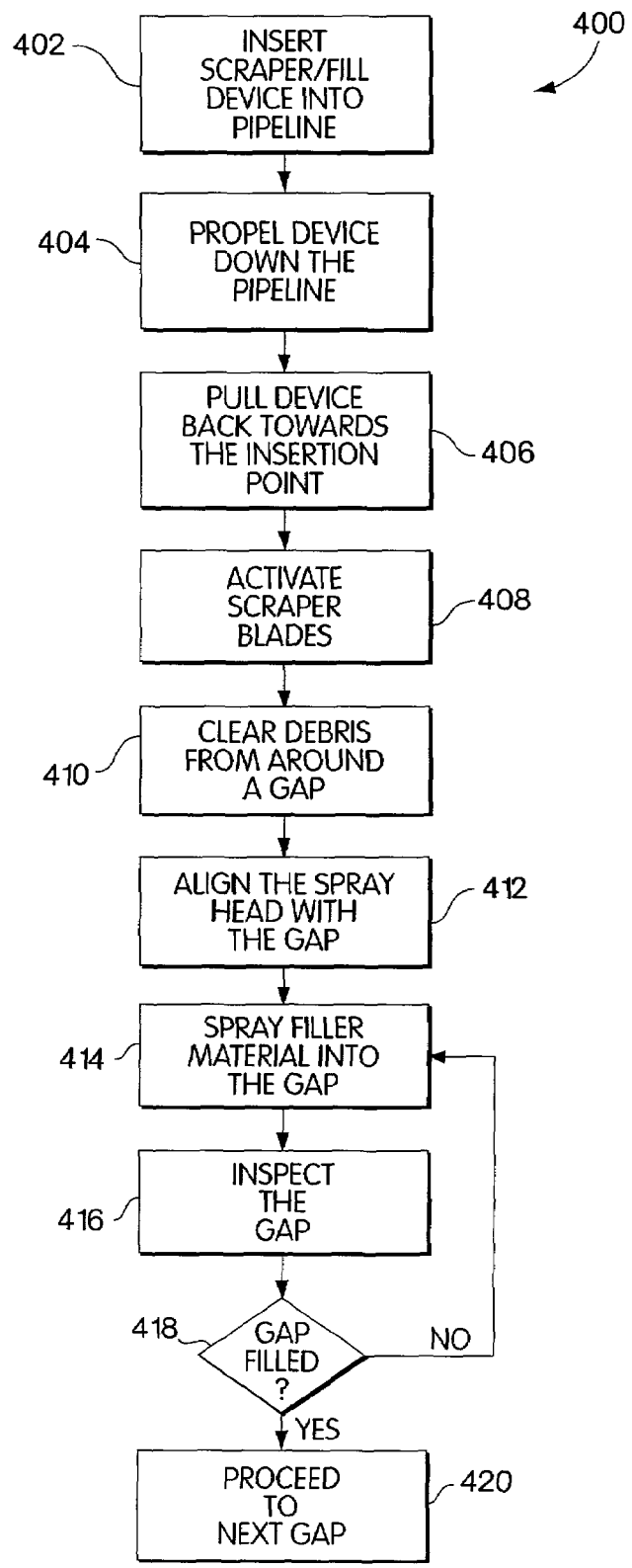
FIG. 24 is a flow chart of a sealing and filling process in accordance with one embodiment of the present invention.

Operation of the device 310 will now be described with reference to FIG. 24, which shows a process 400 of the present invention. When it is desired to fill and seal seams and other gaps in a pipeline, then at stage 402 of the process, the device 310 is first inserted into the pipeline. For a live gas pipeline, one of the procedures described above for device 10 can be used to insert device 310 into the pipeline. In one embodiment, the front of the carriage having the spray head is inserted first. After insertion of the device 310, at stage 404, the device is propelled some distance down the pipeline. In one embodiment, the device is propelled using the containment tube pushing unit described above, under the control of the controller. The distance that the device is propelled may be determined either based on characteristics of the pipeline, i.e. an end of the pipeline is reached, or based on the length of the umbilical cable. While propelled down the length of the pipeline, the laser and camera can be used to locate gaps to be treated.

Once the device reaches the end, the propulsion system begins bringing the device back toward the insertion point, stage 406, treating each of the seams and/or gaps along the way. When a seam is reached, stage 408, the scraper blades are activated just prior to the seam, and debris is removed from the area just before and after the seam. Depending on the amount and type of debris at a seam, as determined by images generated by the camera, the device may be moved back and forth several time to fully scrape all debris around the seam, stage 410.

Once the debris has been removed, at stage 412, the device is moved further towards the insertion point to align the spray head with the seam. The laser and the camera are used to properly align the spray head with the seam. After alignment, at stage 414 filler material is provided to the spray head while the spray head is rotated 360 degrees to apply filler to the seam. After full rotation, the device is slowly moved so that the spray head provides a coat of filler material from a point just on one side of the seam to a point just on the other side of the seam so that the filler material completely bridges the seam. After a coat of material has been sprayed on, at stage 416, the camera is used to view the seam to determine if further coats of material are needed. If a determination is made that further coats are needed, then stages 414 and 416 are repeated. Once the seam has been sufficiently filled, the device 310 moves to the next seam and continues to repeat this process 420, until the device has returned to the insertion point and is removed from the pipeline.

In one embodiment of the present invention, multiple coats of filler material are provided at each gap with a first coat acting as an insulator between the pipe, which is often relatively cool, and the insulating material, which in one embodiment is applied at a temperature of approximately 120 degrees Fahrenheit. The first insulation coat allows the remaining coat(s) to properly cure and maintain a foam-like consistency.

Figure 25:
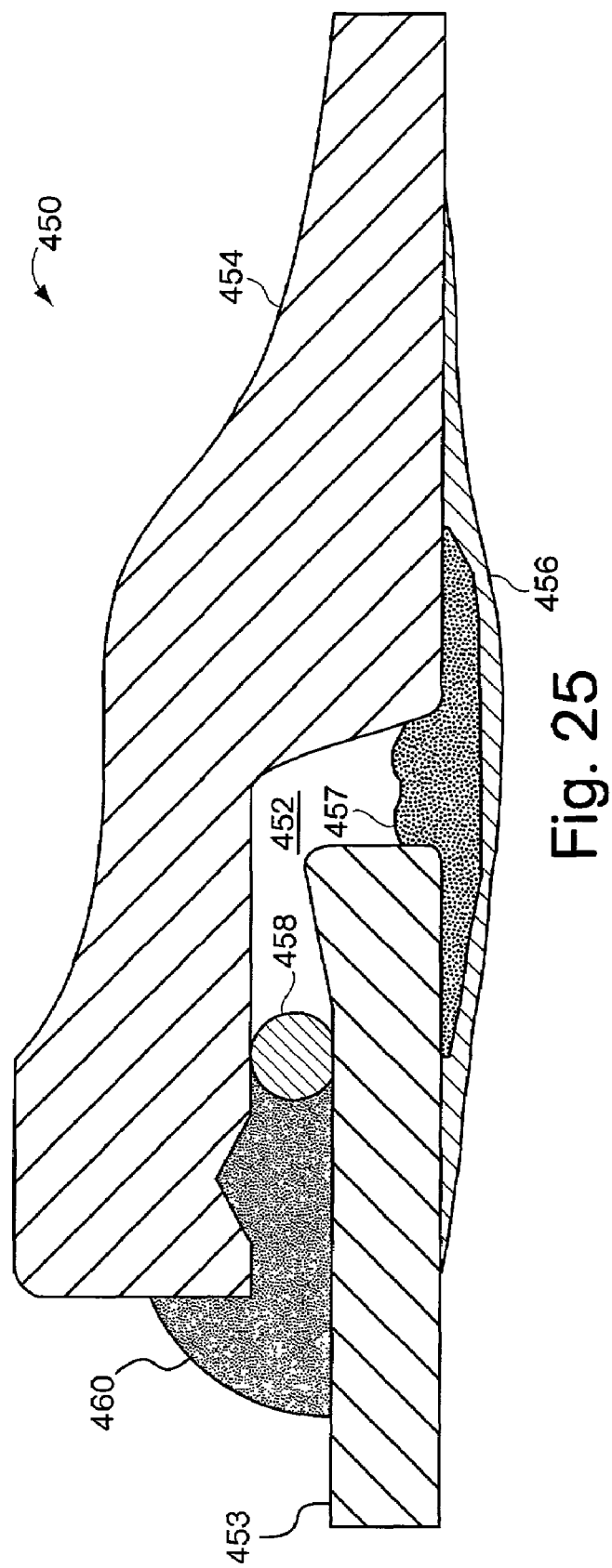
FIG. 25 is a cross-sectional view of a pipeline that has been treated using the process of FIG. 24.
Figure 26:
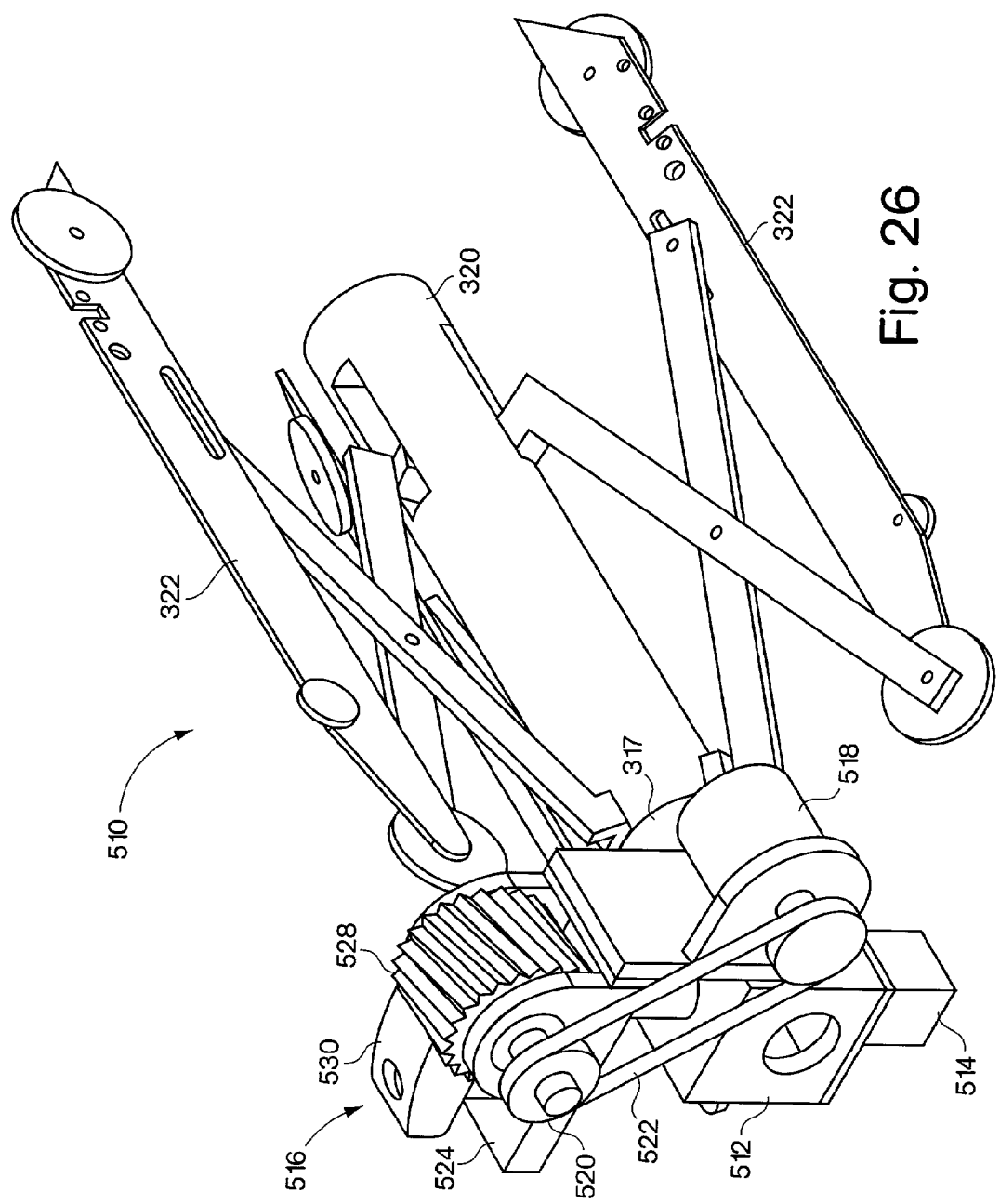
FIG. 26 is a perspective view of a milling device in accordance with one embodiment of the present invention.
Figure 27:
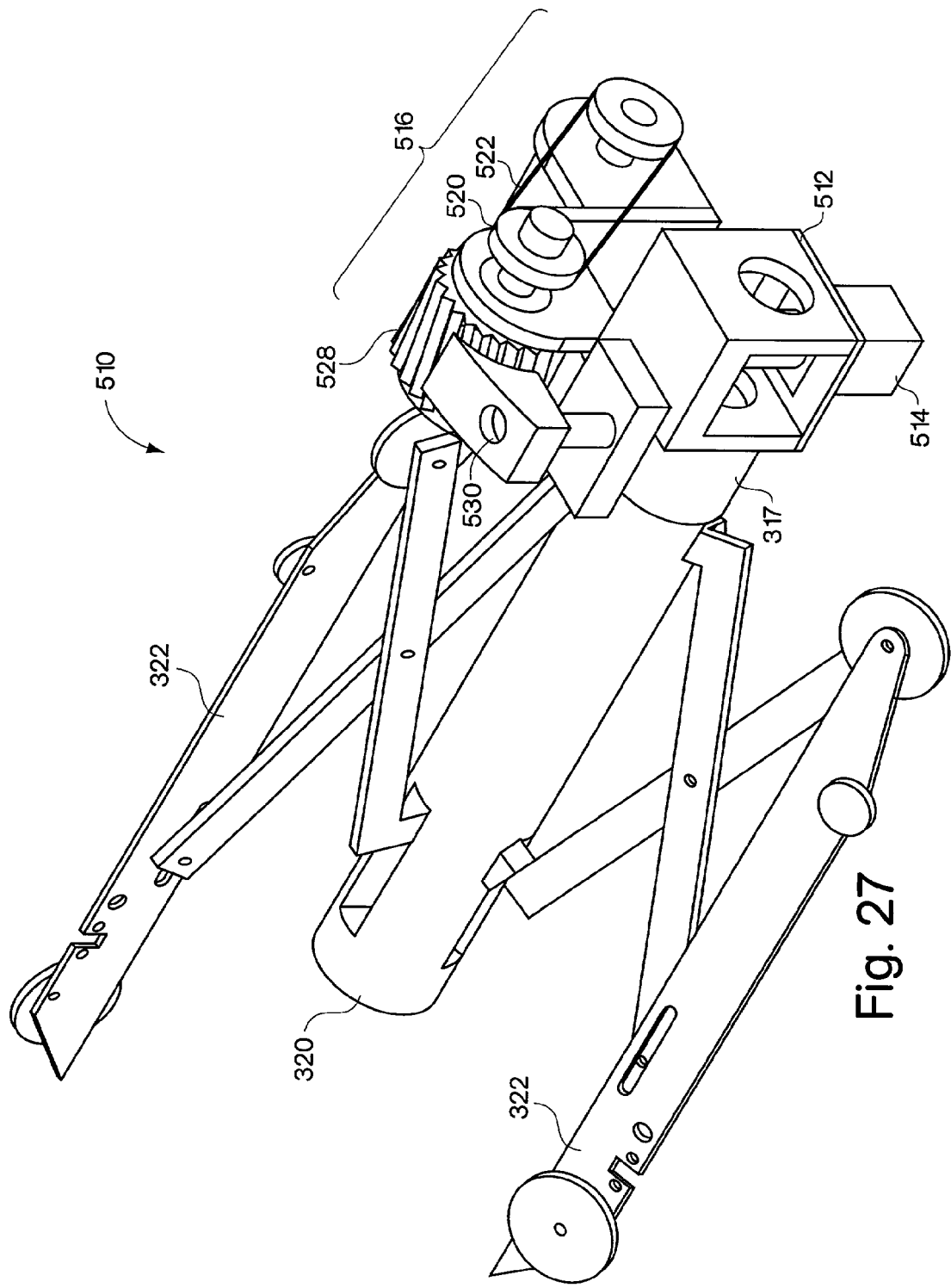
FIG. 27 is a second perspective view of the milling device of FIG. 26.
Figure 28:
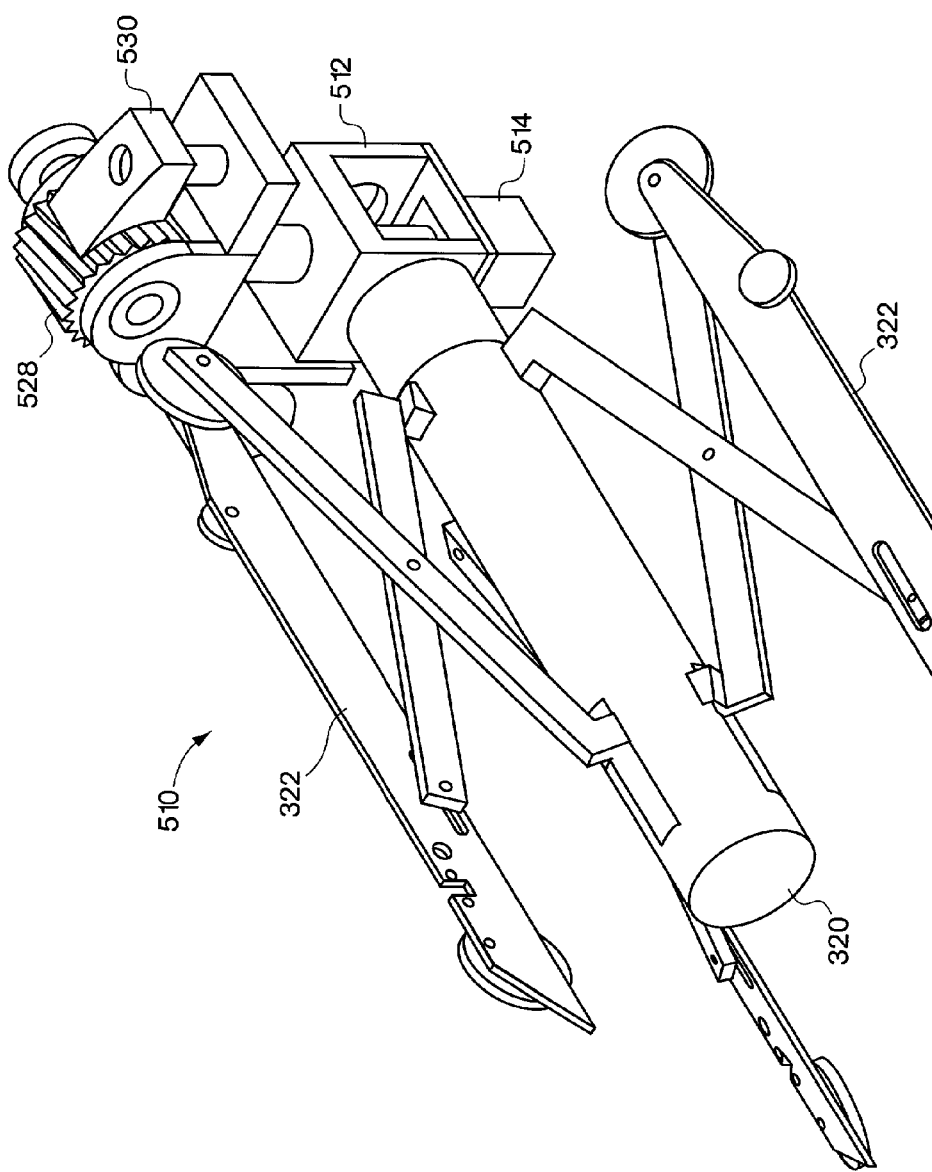
FIG. 28 is a third perspective view of the milling device of FIG. 26.
Figure 29:
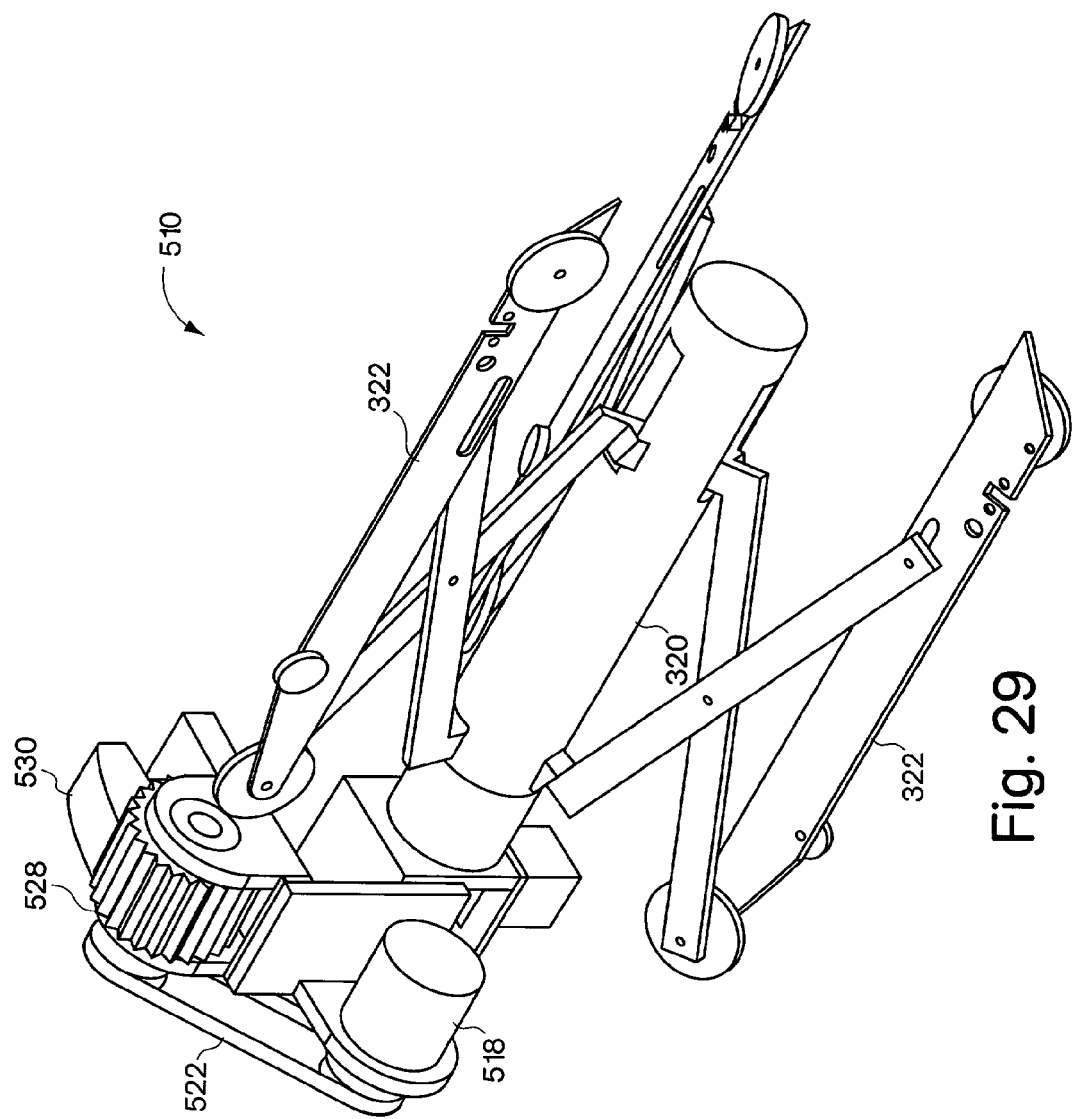
FIG. 29 is a fourth perspective view of the milling device of FIG. 26.

After the device 310 is removed from the pipeline, the device 10, described above, may be inserted into the pipeline to provide sealant over the filler material to completely seal a gap. FIG. 25 shows a section of pipeline 450 having a gap 452 at a joint between a first pipe section 453 and a second pipe section 454. The pipeline 450 been treated using the process described above. A layer of filler material 457 is shown filling the gap in the pipe and a layer of sealant 456 covers the filler material and extends past the filler material in the pipe. Also shown in FIG. 25 is a gasket 458 and filler 460. The gasket 458 and filler 460 are representative of typical sealing materials used to seal gas pipes at the time of initial installation of a pipeline, and these typically degrade over time.

In the embodiment described above, separate fill and sealant devices are provided. In another embodiment, the fill device may be configured to spray both the fill material and the sealant using one spray head or using two separate spray heads on the same device. In the situation where one spray head is used, after the fill process is complete, the lines and the spray head can be purged from the controller, and sealant can be sent to the device instead of fill material. In still other embodiments, only one material may be used to both fill and seal a gap.

In embodiments of the present invention, in addition to removing debris using scrapers as described above, it may also be desirable to provide a more thorough cleaning or scraping of the interior of a pipe to ensure that the sealant properly seals the pipe. In another embodiment of the present invention, a milling device 510 is provided that can be inserted into a pipeline in the same manner as the devices 10 and 310 described above. The milling device 510, which will now be described with reference to FIGS. 26–29 provides a milling operation on each side of a gap prior to the application of filler and sealer. Debris generated by the milling operation can be removed from the area to be treated using the scraper described above. In addition, in some embodiments of the invention, gas nozzles that eject jets of pressurized air (or a compatible gas in gas lines) can be used to clear debris. Still further, debris can also be cleared during a purge operation of the spray head during which gas is ejected from the head.

The milling device 510, in one embodiment of the present invention, is mounted on the centering carriage 320 of the device 310 and includes the expansion legs 322 and the motor/rotary union 317 of the device 310. In addition, the milling device 510 includes a support bracket 512 that supports a piston 514 mounted to a telescoping assembly 516. The piston is extendable under control of the controller to move the telescoping assembly towards the inner wall of a pipeline where milling is to occur.

The telescoping assembly 516 includes a milling tool motor 518, a chain sprocket 520, a drive chain 522, a base plate 524, a side plate 526, a milling tool 528, and a control foot 530. The milling tool motor 518 is mounted to the side plate 526 and is controlled by the controller, located outside of the pipeline and coupled to the milling tool motor through control lines. The chain sprocket 520 is coupled to the drive chain 522 and to the milling tool 528, such that the milling tool is driven by the milling tool motor. The control foot, the chain sprocket and the milling tool are coupled to the base plate 524.

During operation, the piston 514 is extended under control of the motor until the milling tool contacts the inside surface of the pipeline. The motor is then turned on, and the inside of the pipeline, where sealant is to be applied, is ground down using the milling tool. The motor/rotary union 317 rotates the support bracket, and accordingly the milling tool 360, degrees. The control foot is adjustable to set a depth of the cut by the milling tool in the pipeline. When a set depth is reached during a milling operation, the curved outer surface of the control foot contacts the inner surface of the pipeline to prevent the milling device from cutting deeper into a pipeline. In addition, many old pipes are oval rather than round in cross-section, and the foot acts as a restraint and allows the milling device to follow the non-uniform curvature of a pipe's circumference. As with devices 10 and 310, the milling device 510 can be inserted into a pipeline, moved down the pipeline, and then treat surfaces of the pipeline as the milling device returns to the insertion point.

In certain embodiments of the present invention, the sealing operations dictate that it would be more convenient, and increase quality if the joint filling and sealing operation immediately follow the debris moving operation. The reason this is important is the in situ robots would otherwise have to drive over the cleaned area and could drag a significant amount of the umbilical along with it thus depositing debris that had previously been moved from an area back into the cleaned area. Therefore having a debris mover on the in situ robot performing the sealing service is a great advantage.

Figure 30:
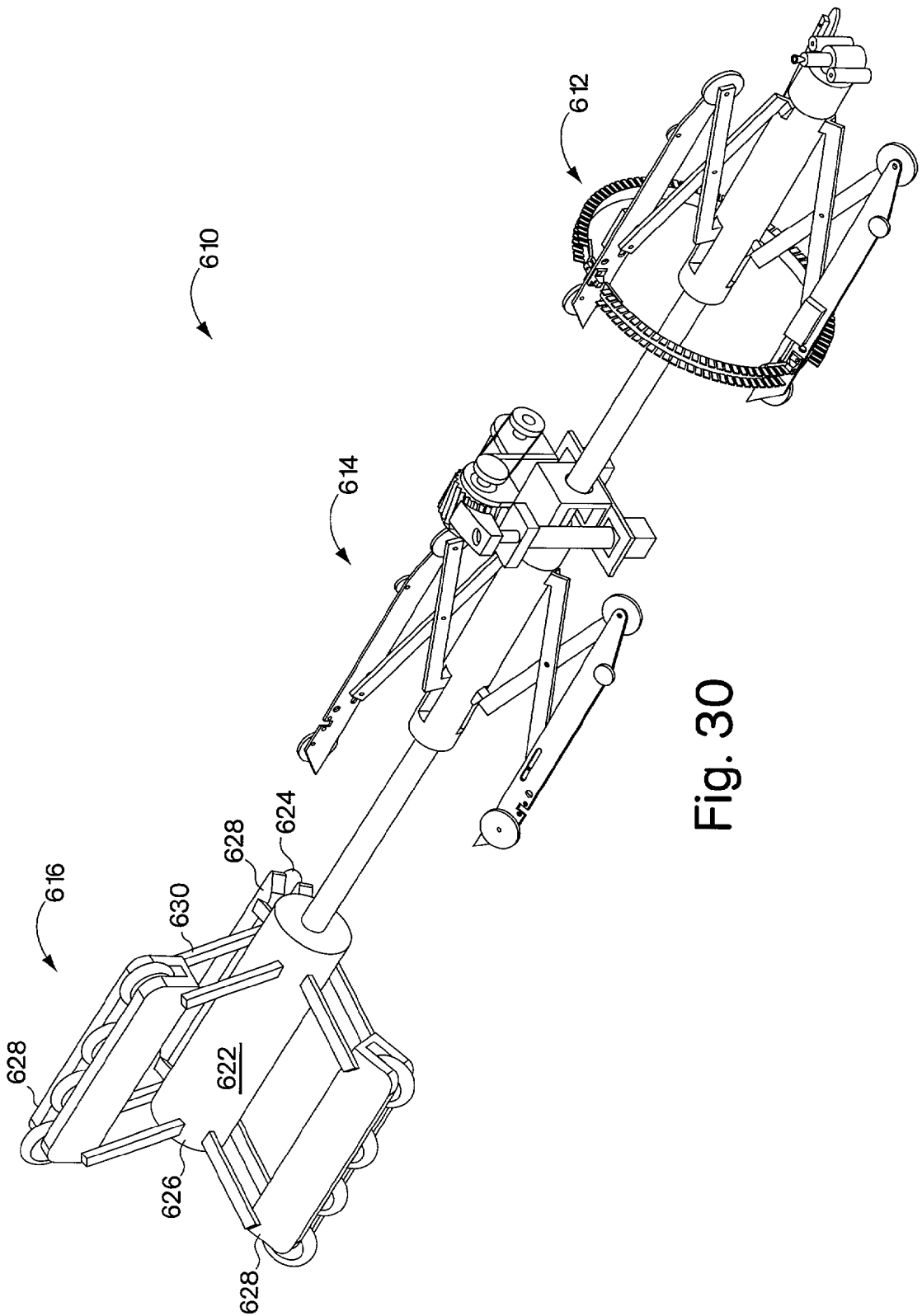
FIG. 30 is a perspective view of a combination milling and sealing device in accordance with one embodiment of the present invention.

In one embodiment of the present invention, which will now be described with reference to FIG. 30, a combination multifunctional device 610 is provided. The device 610 includes a spray and debris moving device 612, a milling device 614 and a tractor robot 616. The spray and debris moving device may be implemented using device 310, described above, modified to spray both fill and sealant, as also described above. The milling device 614 is similar to milling device 510, except that the carriage and support bracket in the device are designed to receive the umbilical and allow it to pass through to the device 612.

The tractor robot 616 is used to pull the umbilical through the pipeline and to push devices 612 and 614 through the pipeline. The tractor robot is used with the device 610 to push the device through a pipeline in place of the push rod system described above for the other embodiments. The tractor robot provides additional propulsion that is useful when pushing the heavier combined device and can increase the range that the device can be pushed down the pipeline. In other embodiments, the device 610 may be implemented in conjunction with the push rod system so that the tractor robot is not needed.

The tractor robot includes a centering chassis 622, a front end 624, a back end 626, three wheel assemblies 628, each of which is coupled to the centering chassis using folding brackets 630, that can fold down to allow insertion of the tractor robot. The back end 626 receives an umbilical coupled to the controller located outside of the pipe line, and passes the umbilical out of the front end 624 to device 614. The tractor robot can be propelled using a hydraulic motor or electric motor mounted in the center of the tractor robot and coupled to the wheels through flexible drive shafts mounted in or adjacent the folding bracket. In another embodiment, high-power miniature motors can be mounted directly in the wheel assemblies. Further, in still another embodiment, each set of wheels can be replaced by a track assembly.

The device 610 is inserted into a pipeline and moved some distance down the pipeline. The insertion into the pipeline can be accomplished using embodiments of the invention described above, except that an extension tube may be needed for the entry system due to the length of the combined system. Specifically, referring to FIG. 10 for example, an extension tube can be inserted between insertion duct 240 and the end 158 of the pushing unit. Similarly, the insertion duct 240 could be altered to have more of a bend radius and extended. Alternatively, the excavation hole could be made larger with the tap holes moved further from the end of the pipe to provide length of pipe to insert device 610. While moved down the pipeline, the milling tool and the scrapers are maintained in the travel mode, and are not in contact with the pipeline. The device 610 is then moved back to the insertion point, and at each gap that is to be filled, the milling tool first operates on both sides of the gap to provide a smooth surface for the sealant. Next, the scrapers on device 612 clear any debris from the area around the gap. The spray head on device 612 then sprays filler into the gap, and after spraying the filler, sprays sealant across the gap. Once all gaps have been filled and sealed, the device 610 is removed from the pipeline.

In embodiments of the present invention described above, a foam filler material is used to fill gaps. The foam expands when setting up (curing) thus spreading into the gap to be filled as opposed to sagging out of it as with typical non-foaming coatings.

In embodiments of the present invention, various spray tips may be used on spray heads for applying the gap bridging foam or other gap filling material. In one embodiment of the present invention, a fan tip is used. In certain other embodiments, the fan tip may be rotated with respect to the center line of the pipeline so that a wider area of material may be laid down with a single pass of the spray head.

Other advantages include having a debris mover with different scrapers for different debris, enhancement of the mixing champers on the spray guns to accommodate both foam and sealant and continuous rotation of the spray nozzle or continuous rotation of the spray gun.

The gas sealing operation of the present invention is designed to address the issue or problem of filling bell joint seams (gaps). Other pipe sealing applications, such as epoxy coating water pipes and grouting sewer pipes, may well benefit from this processes and apparatus of the present invention. Certainly any situation where a robot was required to inspect and/or fill a gap would consist of a potential commercial application for embodiments of the invention.

In the present invention, a debris mover and a milling device work mostly in conjunction with the gap filler but both would certainly be beneficial for any service robot in a piping system which was required to perform both a debris or sediment moving operation in conjunction with the service being performed albeit—pipe wall inspection, tapping, etc.

Figure 31:
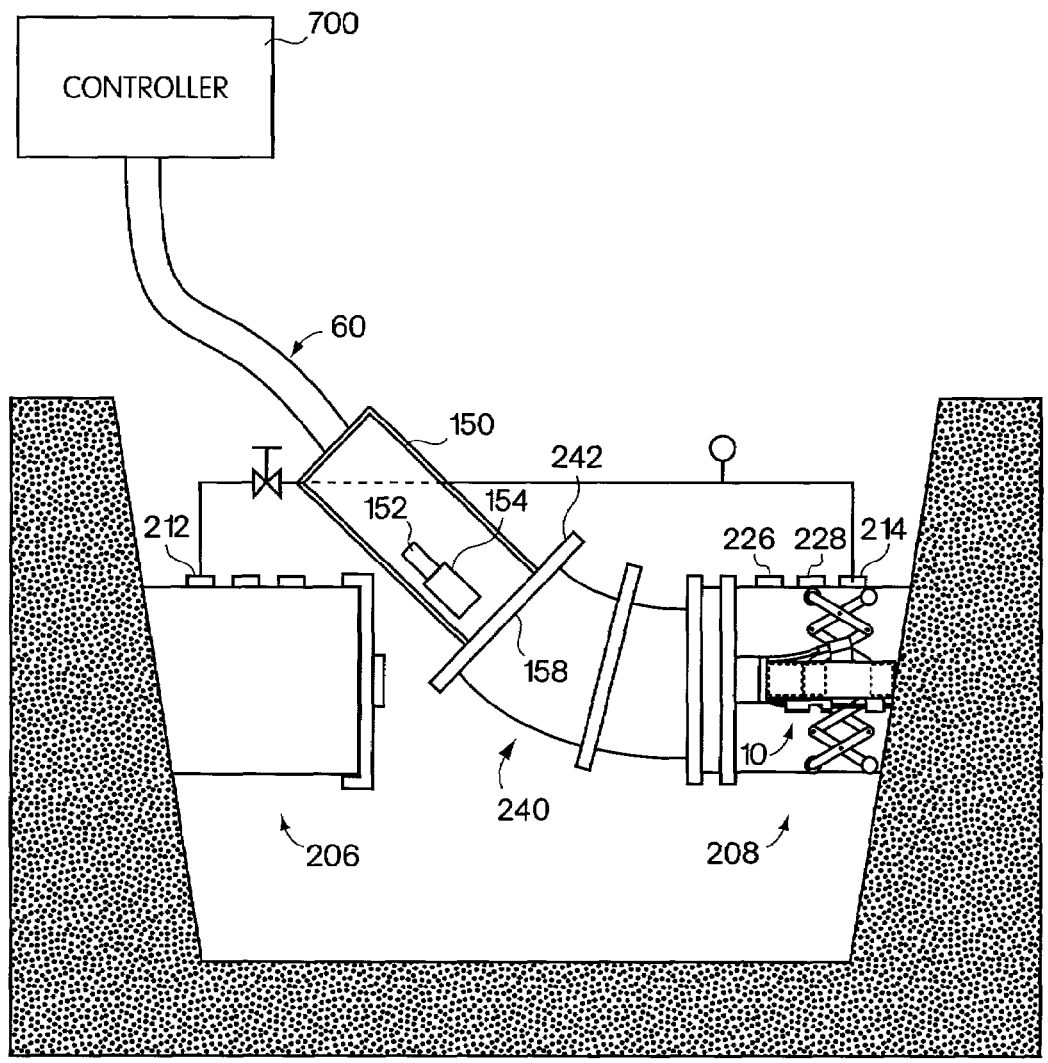
FIG. 31 shows a diagram of a controller coupled to an umbilical in accordance with one embodiment of the present invention.

In embodiments of the present invention described above, a controller outside of the pipeline is described as controlling a number of operations of the devices inserted in a pipeline. The controller is shown in FIG. 31. In embodiments of the present invention, the controller includes various automation sensors, components, computers and software coupled with custom programming that oversees and assists in the control and application of a pipe sealing system. In one embodiment, the controller can be incorporated in a truck or trailer to facilitate moving the controller to different excavation sites. The controller automates many of the functions and aspects identified above increasing and enhancing safety, reliability, repeatability and process balance control that are both mundane and require a high skill level. In embodiments of the present invention, the controller provides a means to log entities seen through video cameras on the robot in the pipe system and conveniently save this data for future use in an electronic computer readable format as well as document the work performed by electronic video capture of before and after photos of the areas sealed. Since these operations are performed in the field, the controller also facilitates the quick transportation of the job specific data to a home office, or other facility, by e-mail since the data is in an electronic format. The home office can then quickly produce reports for distribution and archive as well as billing information in a more efficient manner than otherwise conceivable.

According to one embodiment of the present invention, the controller includes sensors, transducers, motion control devices, a control computer, custom developed programming and a MMI (man-machine interface). The sensors and transducers monitor the state of the process providing data to the control program. The motion control devices send position data to the control program and receive motion instruction data from the control program allowing the control program to know the position of a driving element such as a motor as well as move the driving element a specified amount. The MMI interfaces with the operator and displays information and data from the control program on it's screen, provides the interface for data and command input to the control program and also flashes warning signals indicating a problem or inappropriate requested action. The control computer processes the inputs and outputs, runs the computer program, and writes the appropriate data to an electronic storage device. The custom developed programming contains the code that performs all the desired functions of the automation.

In embodiments of the present invention, transducers, associated with the controller, can be located at desired points in the system and can transmit information to a remote indicator or control computer or a combination of both. By transmitting the sensor information to the controller's computer, the computer can then compare the information and detect and alarm a condition much quicker and more effectively than a human could manually. Since weight of the entire system is also a concern, by displaying the sensor input information on the MMI system components are eliminated or otherwise combined into one device vs. many thus minimizing the weight of the entire system.

Embodiments of the present invention rely on precise motion control for the most effective application of the sealant to the pipe walls, and the automation provided by the controller enhances this process significantly and is much more effective than previously utilized manual systems. Many different factors such as pipe size, ambient conditions, substrate conditions etc. influence the operating parameters of the process and different recipes (or condition dependent operational parameters) can be stored in the controller to provide a reference for the operator to address each condition. This process is significantly streamlined with the automation, and quality control is enhanced by virtue of the automation systems ability to monitor the process more effectively than a human. Further, the controller reviews and controls, on a continual basis, flow rates, heat rates, application speeds, timing issues etc. Automation performs this task more efficiently than a human and minimizes the operator's requirements for this aspect of the process.

By utilizing the controller, system quality control is enhanced in a way that is otherwise not available without significant human intervention susceptible to human error. Also the skill level requirements of an operator have been significantly reduced with the automation. Since the process of sealing pipelines deals with potential disruption of utilities and often requires supervision and labor by the owners of the utilities, anything that can reduce the amount of time to perform the service minimizes the efforts and disruption.

A desired and or required aspect of the sealing services is to provide a document of the work performed. Prior to the present invention, this was typically accomplished utilizing video tape. Video tape is an effective means of documentation, however it requires sitting through the viewing of the tape and fast forwarding to the relative information and or editing the tape to overlay with text identification information. The automation system of embodiments of the present invention has the capability to capture snap shots and video while simultaneously overlaying description information critical for documentation purposes. Manual editing or editing of the video while the service is performed is labor intensive and detracts from the service or requires additional labor.

The controller in embodiments of the present invention may also be used to perform inspection services of the pipe line. Further, in embodiments of the invention, global positioning systems can be used to detect, map and or record the exact position of the robot or other device within a pipeline.

A feature of the present invention is the streamlining of the process, which significantly reduces human requirements and significantly increases safety, and quality control. By streamlining the entire process with automation not only is on site labor reduced but documentation and billing procedures are streamlined, further saving costs and minimizing human error aspects. The clients of the process benefit by receiving the information more quickly and in a more user friendly format at a reduced cost than would have otherwise been deliverable (it would have cost more to process the information to be presented to the client). From a troubleshooting aspect, since the system has the capability to log operational data, one can review the operational parameters after the fact and effectively recreate the scenario, which lead to a problem, or failure, which could only have been available if someone had manually logged information on a continual basis during system operation. Embodiments of the invention facilitate the combination of inspection and rehabilitation services into one operation.

Because the available technology in complimentary industries seems to be limited, the automation system could be of use for other manufacturing industries, which rely on sealant application system performance and quality control issues or could benefit by streamlining their operations. In addition, certain embodiments of the present system may be utilized for natural gas distribution systems, but could be applied to a whole host of other pipelines, including but not limited to propane, water and or sewer pipelines.

In embodiments of the present invention described above, spray heads are used to spray foam and sealant in live gas pipes. In some embodiments, particularly useful for high velocity gas lines or water lines, it may be desirable to install a bladder or tape around the area to be filled or sealed, prior to the sealing or filling process, to prevent the high velocity gas or water from misdirecting the sealant or foam.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only and is not intended as limiting. The invention's limit is defined only in the following claims and the equivalents thereto.

What is claimed is:

1. A system for internally filling a joint or other discontinuity in a pipeline comprising:
    a flexible conduit;
    a fill device removably connected to said flexible conduit, wherein the fill device is constructed and arranged to apply a fill material to an interior surface of said pipeline to fill one or more gaps in the pipeline;
    a propulsion unit connected to at least one of the flexible conduit and the fill device that propels the flexible conduit through said pipeline; and
    a milling device that is constructed and arranged to couple to the flexible conduit and to mill an area of a pipeline prior to application of fill material from the fill device.

2. The system of claim 1, wherein the fill device includes a center carriage and at least one scraper coupled to the center carriage and constructed and arranged to contact an inner surface of the pipeline to move debris on the inner surface.

3. The system of claim 2, wherein the at least one scraper is moveably mounted to the center carriage and constructed and arranged to be moveable between a retracted position and an activated position.

4. The system of claim 3, wherein the at least one scraper is a plurality of scrapers.

5. The system of claim 4, further comprising an entry unit, coupled to the flexible conduit and coupled to the propulsion unit, that is constructed and arranged to mate with a live pipeline.

6. The system of claim 5, wherein the fill device is constructed and arranged to spray foam for filling gaps in a pipeline, and to spray a sealant to seal a gap in a pipeline.

7. The system of claim 6, wherein the fill device is constructed and arranged to spray fill material in the presence of pressurized gas in the pipeline.

8. The system of claim 1, wherein said fill device comprises:
    a carriage having a first end and a second end;
    a spraying mechanism detachably connected to the first end of the carriage; and
    a plurality of adjustable legs, each having a first end and a second end, the first end connected to said carriage, and the second end constructed and arranged to contact an inner surface of the pipeline.

9. The system of claim 8, wherein the fill device further includes:
    rolling members rotatably connected to the second end of the adjustable legs; and
    a monitoring device detachably connected to the carriage.

10. The system as claimed in claim 9 wherein the monitoring device is a sealed explosion-proof camera probe.

11. The system of claim 1, further comprising an entry unit, coupled to the flexible conduit and coupled to the propulsion unit, that is constructed and arranged to mate with a live pipeline.

12. The system of claim 1, wherein the fill device is constructed and arranged to spray foam for filling gaps in a pipeline, and to spray a sealant to seal a gap in a pipeline.

13. The system of claim 1, wherein the fill device is constructed and arranged to spray fill material in the presence of pressurized gas in the pipeline.

14. The system of claim 1, wherein the milling device includes a stop constructed and arranged to contact an inner surface of the pipeline to control a depth of milling in the pipeline by the milling device.

15. The system of claim 1, further comprising:
    a first carriage coupled to the flexible conduit, wherein the fill device is coupled to the first carriage; and
    a second carriage coupled to the first carriage, wherein the milling device is coupled to the second carriage.

16. The system of claim 15, further comprising a tractor device coupled to the flexible conduit, to the first carriage and to the second carriage to propel the first carriage and the second carriage in the pipeline.

* * * * *